US008963978B2

(12) United States Patent
Seki

(10) Patent No.: US 8,963,978 B2
(45) Date of Patent: Feb. 24, 2015

(54) EXPOSURE APPARATUS WITH CORRECTION FOR VARIATIONS IN SENSITIVITY AND IMAGE FORMING APPARATUS USING THE SAME

(75) Inventor: Yuichi Seki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/442,596

(22) Filed: Apr. 9, 2012

(65) Prior Publication Data

US 2012/0268723 A1 Oct. 25, 2012

(30) Foreign Application Priority Data

Apr. 21, 2011 (JP) .................................. 2011-095275

(51) Int. Cl.
| | | |
|---|---|---|
| *B41J 2/435* | (2006.01) | |
| *B41J 2/47* | (2006.01) | |
| *G03G 15/043* | (2006.01) | |
| *H04N 1/113* | (2006.01) | |
| *H04N 1/12* | (2006.01) | |
| *H04N 1/191* | (2006.01) | |

(52) U.S. Cl.
CPC ............ *G03G 15/043* (2013.01); *H04N 1/1135* (2013.01); *H04N 1/12* (2013.01); *H04N 1/191* (2013.01); *H04N 2201/0082* (2013.01)
USPC .......................................... 347/237; 347/247

(58) Field of Classification Search
USPC .................. 347/229, 234–237, 240, 246–254
See application file for complete search history.

(56) References Cited

U.S. PATENT DOCUMENTS

| | | | |
|---|---|---|---|
| 6,222,580 B1 * | 4/2001 | Yamada | 347/247 |
| 6,560,256 B1 | 5/2003 | Seki et al. | 372/38.02 |
| 6,919,979 B2 | 7/2005 | Seki et al. | 359/204 |
| 7,106,770 B2 | 9/2006 | Seki | 372/43 |
| 7,129,967 B2 | 10/2006 | Seki et al. | 347/249 |
| 7,586,511 B2 | 9/2009 | Seki et al. | 347/249 |
| 2003/0156180 A1 | 8/2003 | Koga et al. | 347/129 |
| 2004/0048180 A1 * | 3/2004 | Kojima et al. | 430/69 |

FOREIGN PATENT DOCUMENTS

| | | | | |
|---|---|---|---|---|
| JP | 2004-223716 | | 8/2004 | |
| JP | 2007098681 A | * | 4/2007 | B41J 2/44 |

* cited by examiner

*Primary Examiner* — Hai C Pham
(74) *Attorney, Agent, or Firm* — Fitzpatrick, Cella, Harper & Scinto

(57) ABSTRACT

An exposure apparatus according to this invention uses both a first light source which outputs a light beam corresponding to a drive current corresponding to image information, and a second light source to irradiate the surface of a photosensitive drum with a plurality of light beams. The second laser light source irradiates the photosensitive drum with a laser beam in accordance with a drive current corresponding to a correction value according to which unevenness of potential characteristics due to unevenness of sensitivity of the surface of the photosensitive drum is reduced. The same region on the surface of the photosensitive drum is irradiated with laser beams which are output from the first and second laser light sources onto the photosensitive drum in superposition.

16 Claims, 12 Drawing Sheets

| No. | 0 | 1 | 2 | 3 | 4 | 5 | 6 | 7 | 8 | 9 | 10 | 11 | 12 |
|---|---|---|---|---|---|---|---|---|---|---|---|---|---|
| Δ | 0 | 0.081 | 0.171 | 0.204 | 0.138 | 0.081 | 0.105 | 0.148 | 0.176 | 0.143 | 0.066 | 0.010 | 0 |

EXPOSURE APPARATUS WITH CORRECTION FOR VARIATIONS IN SENSITIVITY AND IMAGE FORMING APPARATUS USING THE SAME

BACKGROUND OF THE INVENTION

1. Field of the Invention

The present invention relates to an exposure apparatus and an image forming apparatus using the same.

2. Description of the Related Art

An electrophotographic image forming apparatus generally exposes the surface of a photosensitive member to a light beam (laser beam) output from a light source (laser light source) provided in an exposure apparatus such as an optical scanning apparatus, thereby forming an electrostatic latent image on the surface of the photosensitive member. The photosensitive member on which an electrostatic latent image is formed may have a sensitivity which varies in each individual position (region), that is, unevenness of sensitivity on its surface. This unevenness of sensitivity may occur due to the difficulty in maintaining the thickness of a photosensitive layer of a photosensitive member constant in a process of manufacturing the photosensitive member. When the photosensitive member has unevenness of sensitivity, the surface potential of the photosensitive member varies in each individual region even if the surface of the photosensitive member is charged by a charging device under the same conditions and exposed by an exposure apparatus under the same conditions. As a result, potential unevenness (error) may occur in this surface potential. Therefore, if unevenness occurs in the potential characteristics of the surface of the photosensitive member, density unevenness may occur in the formed image upon development of the electrostatic latent image using a developing material such as toner.

As a technique to compensate for such an error of the surface potential of the photosensitive member due to its unevenness of sensitivity, a technique as described in, for example, Japanese Patent Laid-Open No. 2004-223716 has been proposed. According to this patent literature, in an image forming apparatus including a single laser light source, the power of light from the laser light source is controlled using a correction value corresponding to unevenness of sensitivity of a photosensitive member so as to uniform the surface potential (each of the dark portion potential and light portion potential) of an electrostatic latent image formed on the photosensitive member. More specifically, a correction value for the sensitivity in each region on the photosensitive member is determined from sensitivity data representing this sensitivity, and a drive current to be applied to the laser light source is corrected in accordance with the determined correction value.

In light power control described in Japanese Patent Laid-Open No. 2004-223716, a drive current applied to the laser light source is corrected in accordance with unevenness of sensitivity of the photosensitive member to correct, in turn, an error of the surface potential of the photosensitive member. In forming an image, the laser light source irradiates the photosensitive member with a laser beam in light power corresponding to image information in accordance with light emitting characteristics determined depending on the drive current controlled by such light power control. However, when the drive current applied to the laser light source is changed by such light power control, the light emitting response of the laser light source changes. In this case, due to this change in light emitting response, the light emitting characteristics of the laser light source shift from ideal light emitting characteristics determined depending on the drive current. Especially when the drive current is modulated (by, for example, pulse width modulation) in accordance with image information so that the laser light source emits light in power corresponding to the image information, an error may occur between the actual power of light and the ideal power of light determined depending on the drive current. As a result, when the photosensitive member is irradiated with a laser beam corresponding to the image information, the above-mentioned error resulting from unevenness of sensitivity of the photosensitive member remains in the surface potential of the photosensitive member, so the image quality may degrade.

SUMMARY OF THE INVENTION

The present invention has been made in consideration of the above-mentioned problem, and provides a technique to reduce a potential error that occurs on the surface of a photosensitive member due to a change in light emitting response of a light source in an exposure apparatus.

According to one aspect of the present invention, there is provided an exposure apparatus comprising: a light source configured to emit a light beam exposing a photosensitive member; and a control unit configured to cause the light source to execute a first exposure operation exposing the photosensitive member with the light beam emitted from the light source in accordance with a drive current based on image information, and cause the light source to execute a second exposure operation exposing the photosensitive member with the light beam emitted from the light source in accordance with a corrected current based on a position on a surface of the photosensitive member.

According to another aspect of the present invention, there is provided an image forming apparatus comprising: a photosensitive member; a charging unit configured to charge a surface of the photosensitive member; an exposure apparatus configured to expose the surface of the photosensitive member with a light beam to form an electrostatic latent image on the surface of the photosensitive member; and a developing unit configured to develop the electrostatic latent image formed on the surface of the photosensitive member using a developing material to form, on the surface of the photosensitive member, an image to be transferred onto a printing material, the exposure apparatus comprising a light source configured to emit a light beam exposing the photosensitive member, and a control unit configured to cause the light source to execute a first exposure operation exposing the photosensitive member with the light beam emitted from the light source in accordance with a drive current based on image information, and cause the light source to execute a second exposure operation exposing the photosensitive member with the light beam emitted from the light source in accordance with a corrected current based on a position on a surface of the photosensitive member.

According to the present invention, it is possible to provide a technique to reduce a potential error that occurs on the surface of a photosensitive member due to a change in light emitting response of a laser light source in an exposure apparatus.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Configuration of Image Forming Apparatus 1

The configuration of an image forming apparatus 1 according to the first embodiment of the present invention will be described first with reference to FIG. 1. The image forming apparatus 1 executes an image forming process of forming an image on the surface of a transfer material (printing material) P based on input image information. The image information may be input from an image reading apparatus 300 or input via a network from other external apparatuses such as an information processing apparatus (computer). The image forming process includes a charging process, exposure process, developing process, transfer process, and fixing process to be described hereinafter. The image forming apparatus 1 sequentially executes these processes to form an image on the surface of the transfer material P.

Figure 1:
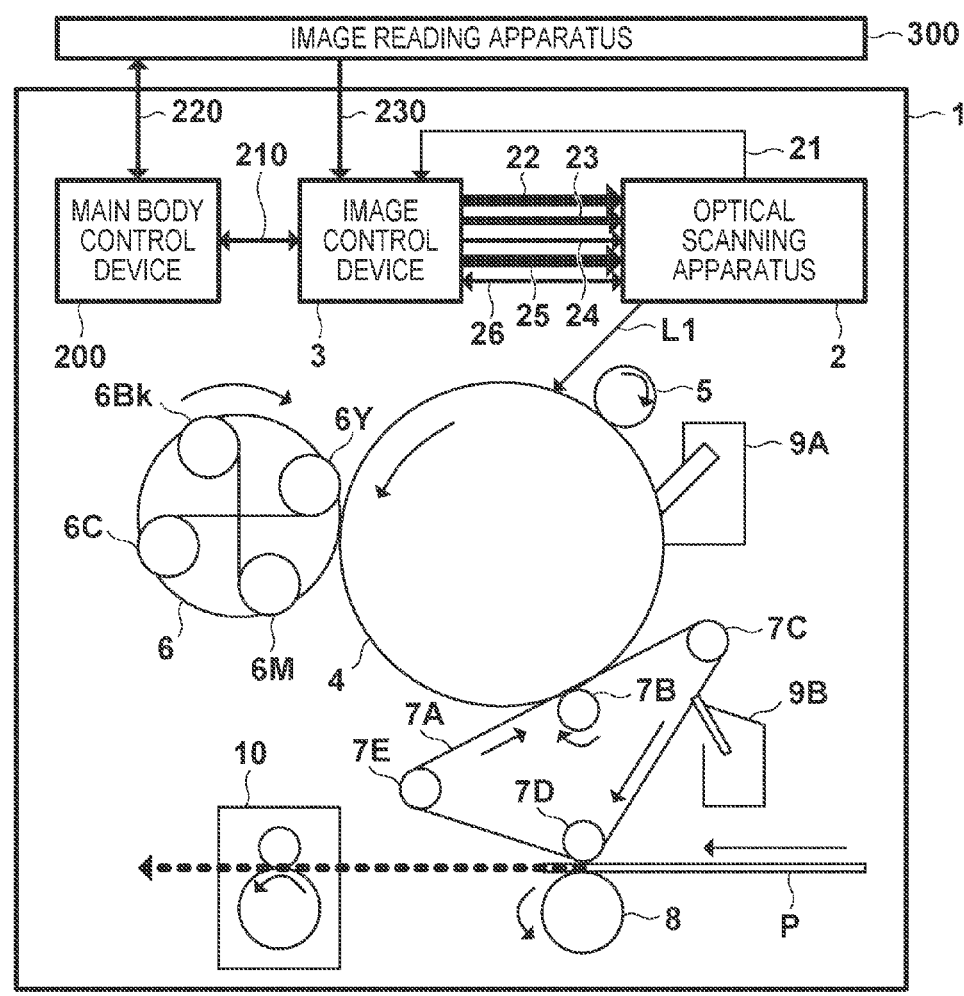
FIG. 1 is a block diagram showing the configuration of an image forming apparatus 1 according to an embodiment of the present invention.

The image forming apparatus 1 includes a drum-shaped photosensitive drum 4 which rotates in a direction indicated by an arrow in FIG. 1 as an example of the photosensitive member. A charging roller 5 and a developing unit 6 are placed around the photosensitive drum 4 in the order named in the direction in which it rotates. The charging roller 5 serves as a charging unit which charges the surface of the photosensitive drum 4. The developing unit 6 develops an electrostatic latent image formed on the surface of the photosensitive drum 4. An intermediate transfer belt 7A and a cleaner 9A also are placed around the photosensitive drum 4. A toner image is transferred from the photosensitive drum 4 onto the intermediate transfer belt 7A. The cleaner 9A removes the toner remaining on the surface of the photosensitive drum 4 after the transfer of the toner image onto the intermediate transfer belt 7A to clean this surface. The intermediate transfer belt 7A is looped around three rollers: a driving roller 7C, a secondary transfer opposing roller 7D, and a tension roller 7E. The tension roller 7E maintains a constant tensile force in the intermediate transfer belt 7A. The driving roller 7C drives the intermediate transfer belt 7A to transport it in a direction indicated by arrows in FIG. 1.

A transfer roller 8 is placed next to the intermediate transfer belt 7A. The transfer roller 8 serves to transfer a color toner image on the intermediate transfer belt 7A onto the surface of the transfer material P. The intermediate transfer belt 7A and transfer roller 8 are placed in contact with each other in a transport path along which the transfer material P fed from a paper feed cassette (not shown) is transported (in a direction indicated by an arrow). A fixing device 10 is placed downstream of the transfer roller 8 in the transport path.

The developing unit 6 develops an electrostatic latent image formed on the surface of the photosensitive drum 4, using a developing material such as toner to form a developing material image (toner image) on the surface of the photosensitive drum 4. The developing unit 6 includes a plurality of developers 6Y, 6M, 6C, and 6Bk. The developers 6Y, 6M, 6C, and 6Bk store developing materials of yellow (Y), magenta (M), cyan (C), and black (Bk), respectively, obtained by mixing toners and carriers at a predetermined ratio. The developers develop electrostatic latent images formed on the surface of the photosensitive drum 4, using developing materials of different colors.

The image forming apparatus 1 includes a main body control device 200 and image control device 3 as a control mechanism which controls the operation of the image forming apparatus 1. The image forming apparatus 1 also includes an optical scanning apparatus (exposure apparatus) 2 which emits a light beam (laser beam) to scan the surface of the photosensitive drum 4. The optical scanning apparatus 2 exposes the surface of the photosensitive drum 4 with a laser beam corresponding to input image information. The main body control device 200 controls the operation of the overall image forming apparatus 1. The image control device 3 converts image information of each color into image data for laser output and outputs it to the optical scanning apparatus 2, in accordance with an instruction from the main body control device 200.

Each process executed in an image forming process by the image forming apparatus 1 will be described next. Upon the start of an image forming process, the image forming apparatus 1 starts a charging process first. In the charging process, the image forming apparatus 1 applies a charging bias from a power supply (not shown) to the charging roller 5 so that the charging roller 5 uniformly charges the surface of the photosensitive drum 4 to a predetermined potential.

In an exposure process, the optical scanning apparatus 2 exposes the surface of the photosensitive drum 4 charged to a predetermined potential (dark portion potential). First, the image control device 3 sequentially converts pieces of image information of Y, M, C, and Bk input from the image reading apparatus 300 into image data of these colors, and outputs them to the optical scanning apparatus 2. The optical scanning apparatus 2 irradiates the surface of the photosensitive drum 4 with laser beams L1 based on the image data of each color to expose this surface. The surface potential of a portion irradiated with the laser beams L1 on the surface of the photosensitive drum 4 changes from the above-mentioned predetermined potential to a different potential (light portion potential). Upon this operation, an electrostatic latent image of each color is sequentially formed on the surface of the photosensitive drum 4. The electrostatic latent image of each color moves from the position at which the surface of the photosensitive drum 4 is irradiated with a laser beam by the optical scanning apparatus 2 to a developing position at which the developing unit 6 and photosensitive drum 4 contact with each other, with rotation of the photosensitive drum 4 (in a direction indicated by an arrow).

In a developing process, first, the developing unit 6 rotates in a direction indicated by an arrow so that a developer (the developer 6Y, 6M, 6C, or 6Bk) corresponding to the color of the electrostatic latent image to be developed moves to the developing position. The developers 6Y, 6M, 6C, and 6Bk develop the electrostatic latent images formed on the surface of the photosensitive drum 4, using toners of different colors at the developing position. More specifically, toners of different colors stored in the developers 6Y, 6M, 6C, and 6Bk adhere to the latent image portions on the surface of the photosensitive drum 4 to sequentially form a toner image of each color on the surface of the photosensitive drum 4. The formed toner image of each color moves from the developing position to a primary transfer position at which the photosensitive drum 4 and a primary transfer roller 7B contact with each other on opposite sides of the intermediate transfer belt 7A, with rotation of the photosensitive drum 4.

In a transfer process, the toner images of the four colors sequentially formed on the surface of the photosensitive drum 4 by the developing unit 6 sequentially undergo primary transfer on the intermediate transfer belt 7A in superposition at a primary transfer position. That is, the M, C, and Bk toner images are transferred onto the surface of the intermediate transfer belt 7A in superposition at the same position as that at which the Y toner image is formed on the surface of the intermediate transfer belt 7A. As a result, a color toner image formed by the four color toner images is formed on the surface of the intermediate transfer belt 7A. Note that the image forming apparatus 1 applies a predetermined transfer bias from a power supply (not shown) to the primary transfer roller 7B to transfer the toner image from the photosensitive drum 4 onto the intermediate transfer belt 7A.

In the transfer process, with rotation of the intermediate transfer belt 7A, the color toner image formed on its surface moves to a secondary transfer position at which the transfer roller 8 and secondary transfer opposing roller 7D contact with each other on opposite sides of the intermediate transfer belt 7A. At the secondary transfer position, the transfer roller 8 performs secondary transfer of the toner image on the intermediate transfer belt 7A onto the transfer material P. The transfer material P having the unfixed toner image transferred on its surface is transported to the fixing device 10 along the transport path. In a fixing process, the fixing device 10 applies heat and a pressure to the transfer material P to fix the unfixed toner image on the transfer material P.

Note that the cleaner 9A removes, for example, the toner remaining on the surface of the photosensitive drum 4 after primary transfer, thereby cleaning the surface of the photosensitive drum 4. Also, a cleaner 9B removes, for example, the toner remaining on the surface of the intermediate transfer belt 7A after secondary transfer, thereby cleaning the surface of the intermediate transfer belt 7A. After the toner remaining on the surface of each of the photosensitive drum 4 and intermediate transfer belt 7A is thus removed, the image forming apparatus 1 executes the next image forming process.

Configuration of Optical Scanning Apparatus (Exposure Apparatus) 2

The configuration of the optical scanning apparatus (exposure apparatus) 2 will be described next with reference to FIG. 2. The optical scanning apparatus 2 includes constituent elements other than the photosensitive drum 4 among those shown in FIG. 2. That is, the optical scanning apparatus 2 includes a semiconductor laser 11, laser driving device (laser control unit) 12, collimator lens 13, light power detection (PD) unit 14, cylindrical lens 16, scanner motor unit 17, polygon mirror 17a, $f$-$\theta$ lens 18, reflecting mirror 19, and beam detection (BD) sensor 20.

The semiconductor laser 11 includes a plurality of laser diodes LD and can simultaneously output a plurality of light beams (laser beams) from these plurality of laser diodes. The laser driving device 12 controls driving of the semiconductor laser (its laser diodes LD) based on a drive current supplied to the semiconductor laser 11 (its laser diodes LD). A laser beam output from the semiconductor laser 11 is transmitted through the collimator lens 13, is converted into a collimated beam by the collimator lens 13, and enters the PD unit 14.

The PD unit 14 includes an internal reflecting mirror 14a and a light power detector 14b on its beam output surface. The reflecting mirror 14a has a property of partially reflecting a laser beam from the semiconductor laser 11. The laser beam reflected by the reflecting mirror 14a is received by the light power detector 14b. The light power detector 14b serves as a measuring element which measures the light power of the received laser beam. Upon receiving the laser beam, the light power detector 14b outputs a PD current (light power detection signal) 15 corresponding to the light power (intensity) of the received laser beam to the laser driving device 12. In this way, the PD unit 14 uses the light power detector 14b to measure the light power of a laser beam emitted by the semiconductor laser 11, and outputs a PD current 15 corresponding to the measured light power to the laser driving device 12. The laser driving device 12 performs automatic light power control (to be described later), that is, APC (Automatic Power Control) based on the PD current 15 output from the PD unit 14, thereby adjusting a drive current supplied to the semiconductor laser 11.

A laser beam which is output from the semiconductor laser 11 and passes through the PD unit 14 further passes through the cylindrical lens 16 and reaches the polygon mirror 17a. The polygon mirror 17a is driven by the scanner motor unit 17 including a scanner motor, thereby rotating at a constant angular velocity. Note that the scanner motor unit 17 rotates the polygon mirror 17a based on the control of the image control device 3 using a motor control signal 26, as will be described later with reference to FIG. 3. The polygon mirror 17a is a rotating polygon mirror which deflects a laser beam while rotating at a constant angular velocity so that the laser beam scans the surface of the photosensitive drum 4. The laser beam deflected by the polygon mirror 17a enters the f-θ lens 18.

Figure 2:
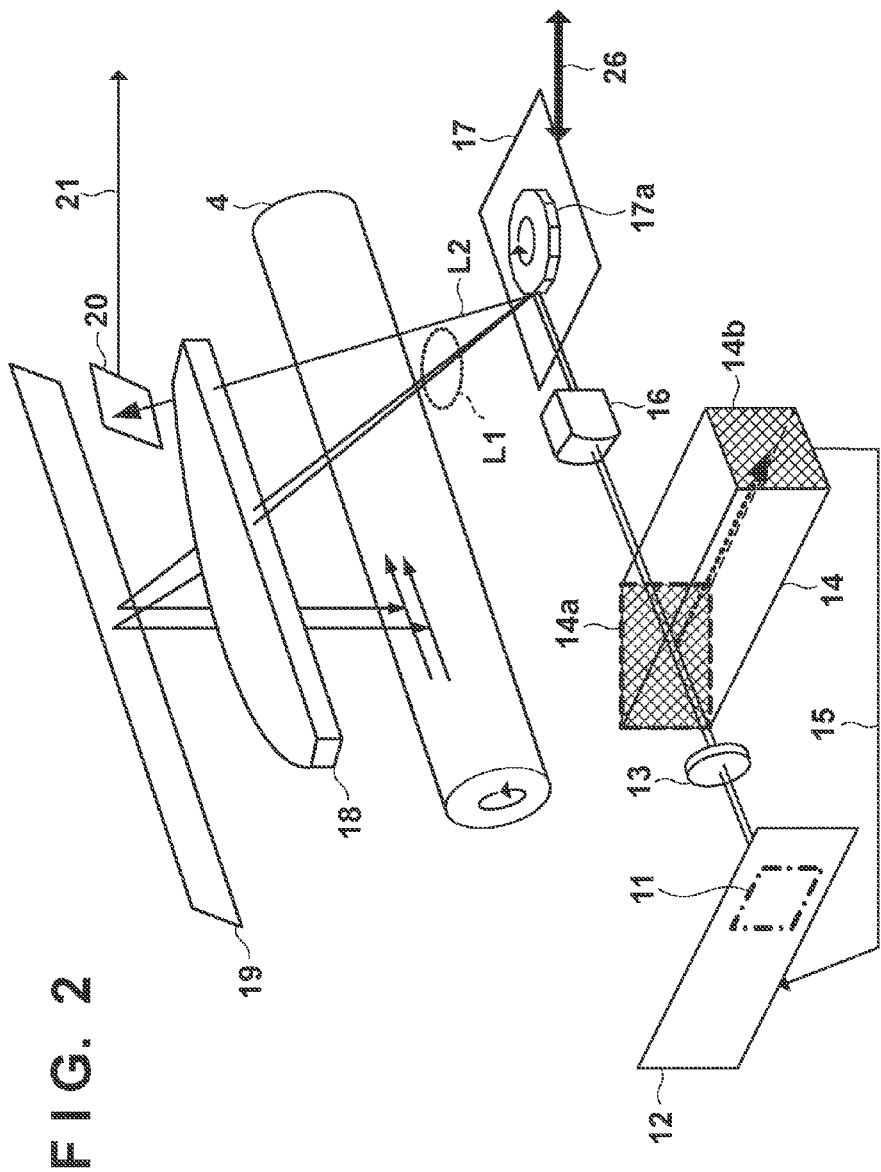
FIG. 2 is a view showing the configuration of an optical scanning apparatus (exposure apparatus) 2 according to the embodiment of the present invention.

Referring to FIG. 2, of laser beams which enter the f-θ lens 18, laser beams L1 which travel along optical paths denoted by reference symbol L1 in accordance with the angle of rotation of the polygon mirror 17a scan and expose the surface of the photosensitive drum 4 to form an electrostatic latent image on the photosensitive drum 4 in one laser beam scanning cycle. On the other hand, a laser beam L2 which travels along an optical path denoted by reference symbol L2 in accordance with the angle of rotation of the polygon mirror 17a is on the edge of the laser beam scanning range, and enters the BD sensor 20 to generate a synchronization signal used in, for example, control of the image position in a direction parallel to the rotation axis of the photosensitive drum 4 and control of the rotation speed of the polygon mirror 17a, in one laser beam scanning cycle.

The laser beams L1 pass through the f-θ lens 18, are reflected by the reflecting mirror 19, and reach the photosensitive drum 4. The f-θ lens 18 has a function of performing speed conversion so that the traces of the laser beams L1 move at a constant speed in a direction (the main scanning direction of the laser beams L1, that is, a direction parallel to the rotation axis of the photosensitive drum 4) perpendicular to the direction (the sub-scanning direction of the laser beams L1) in which the photosensitive drum 4 rotates, on the surface (scanning plane) of the photosensitive drum 4. Upon this operation, the photosensitive drum 4 is irradiated with the laser beams L1 output from the semiconductor laser 11 to form an electrostatic latent image on the surface of the photosensitive drum 4.

On the other hand, at least one of the laser beams L1, that is, the laser beam L2 shown in FIG. 2 passes through the f-θ lens 18, is reflected by the reflecting mirror 19, and reaches the BD sensor 20. That is, the laser driving device 12 supplies a drive current to the semiconductor laser 11 at a timing at which the laser beam L2 travels along an optical path denoted by reference symbol L2 (a timing at which the laser beam L2 enters the BD sensor 20). Upon receiving the laser beam L2, the BD sensor 20 outputs a beam detection (BD) signal 21 as a reference to scan the photosensitive drum 4 with the laser beam L1. The BD signal 21 output from the BD sensor 20 is supplied to the image control device 3.

Procedure of Image Forming Operation by Image Forming Apparatus 1

Figure 3:
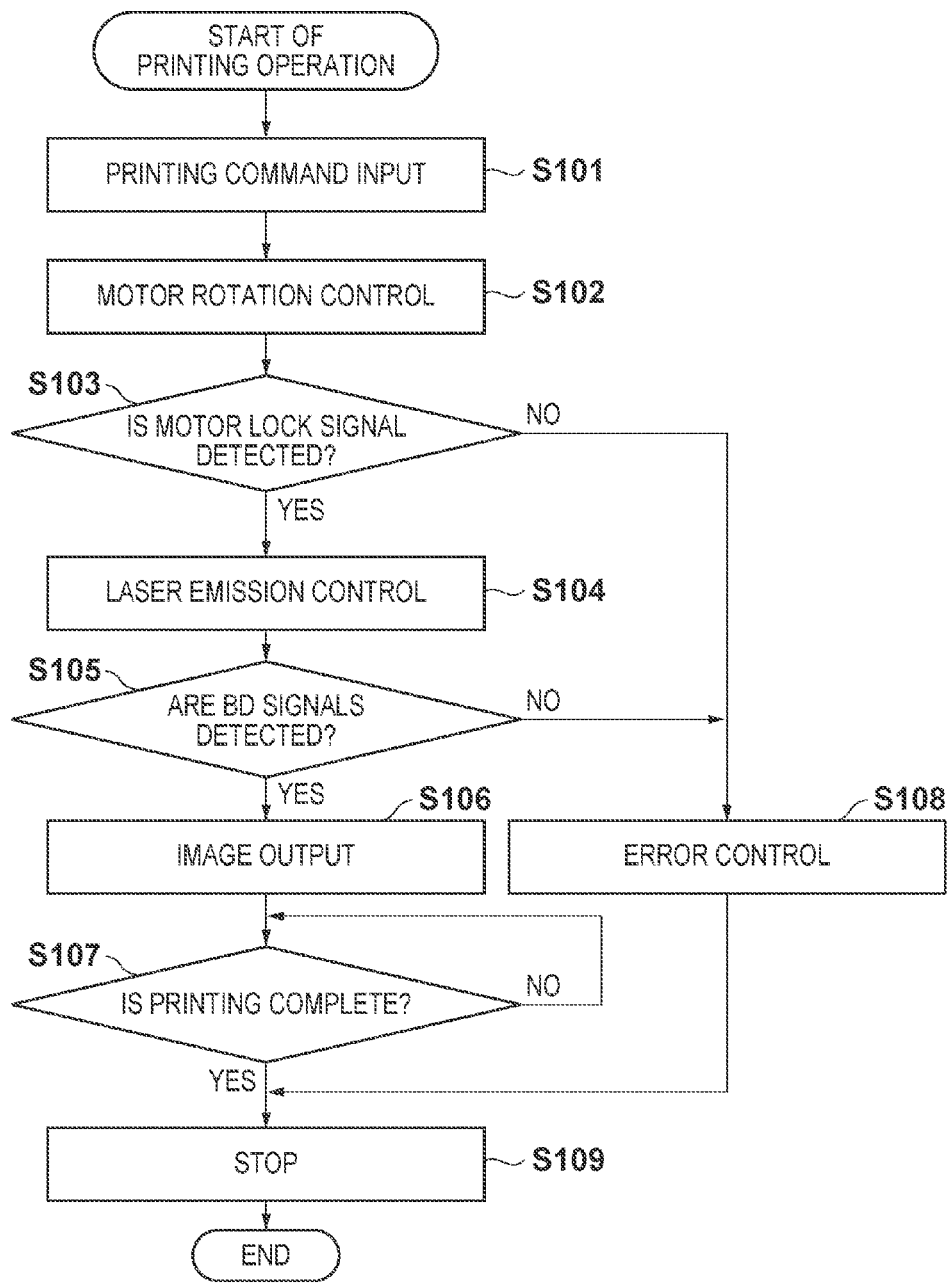
FIG. 3 is a flowchart showing the procedure of an image forming operation by the image forming apparatus 1 according to the embodiment of the present invention.

The procedure of an image forming (printing) operation executed by the image forming apparatus 1 based on the control of the image control device 3 will be described next with reference to a flowchart shown in FIG. 3.

In step S101, the image control device 3 accepts an input of a printing command from the main body control device 200 based on an image control signal 210. In step S102, the image control device 3 outputs a rotation operation signal indicating that the polygon mirror 17a is to be rotated to the scanner motor unit 17 in the optical scanning apparatus 2 based on a motor control signal 26. The scanner motor unit 17 starts rotation control of the polygon mirror 17a in accordance with the rotation operation signal from the image control device 3.

In step S103, the image control device 3 determines whether a motor lock signal indicating that the scanner motor which rotates the polygon mirror 17a has entered a stable rotation state is detected, based on the motor control signal 26 output from the scanner motor unit 17. If the image control device 3 determines in step S103 that the motor lock signal is detected, it advances the process to step S104. In step S104, the image control device 3 controls the laser driving device 12 based on laser control signals 23 so that the laser driving device 12 starts light emission control of the semiconductor laser 11. The image control device 3 makes a shift to an operating mode in which BD signals 21 output from the BD sensor 20 in the optical scanning apparatus 2 are detected.

In step S105, the image control device 3 determines whether it is detected that BD signals 21 have been input from the BD sensor 20 in the optical scanning apparatus 2 a predetermined number of times. If the image control device 3 detects in step S105 that BD signals 21 have been input a predetermined number of times, it advances the process to step S106. In step S106, the image control device 3 outputs image data 22 to the laser driving device 12 in the optical scanning apparatus 2 at a timing determined with reference to that at which the BD signals 21 are detected.

The optical scanning apparatus 2 (laser driving device 12 and semiconductor laser 11) irradiates the photosensitive drum 4 with the laser beams L1 to expose the surface of the photosensitive drum 4 with the laser beams L1, based on the image data 22 received from the image control device 3, as described above. Further, the optical scanning apparatus 2 executes a process corresponding to the above-mentioned image forming process, thereby finally forming, on the transfer material P, a toner image obtained by developing an electrostatic latent image formed by the exposure of the surface of the photosensitive drum 4. In step S107, during the image forming (printing) operation, the image control device 3 determines whether a printing operation is complete. As long as the image control device 3 determines that the printing operation is incomplete, it repeats the determination process in step S107. However, if the image control device 3 determines that the printing operation is complete, it advances the process to step S109.

After the end of the printing operation, the image control device 3 controls the scanner motor unit 17 in the optical scanning apparatus 2 based on the motor control signal 26 to stop the rotation operation of the polygon mirror 17a in step S109. Also, the image control device 3 controls the laser driving device 12 in the optical scanning apparatus 2 based on laser control signals 23 to turn off the semiconductor laser 11. In this way, the image control device 3 performs stop control under which the operation of the optical scanning apparatus 2 is stopped.

Note that if the image control device 3 does not detect a motor lock signal in step S103 or BD signals 21 in step S105, it determines that an operation error has occurred in the optical scanning apparatus 2. In this case, in step S108, the image control device 3 outputs an error signal indicating that an operation error has occurred in the optical scanning apparatus 2 to the main body control device 200 based on the image control signal 210. In step S109, the image control device 3 performs stop control of the optical scanning apparatus 2, as described above.

Mechanism in Which Unevenness of Potential Occurs in Photosensitive Drum 4

Unevenness of sensitivity may be generally present in the photosensitive drum 4, as shown in FIG. 1. This is because the sensitivity characteristics of the photosensitive drum 4 are uneven in all regions on the surface of the photosensitive drum 4 due to the occurrence of a variation in thickness of a photosensitive layer in a process of manufacturing the photosensitive drum 4. Even when the entire surface of the photosensitive drum 4 having unevenness of sensitivity is charged under the same conditions, and the semiconductor laser 11 irradiates this entire surface with a laser beam in the same light power in this way, the surface potential of the photosensitive drum 4 remains uneven, so unevenness of potential (unevenness of potential characteristics) occurs. In this case, even when the uniformly charged surface of the photosensitive drum 4 is exposed with a laser beam corresponding to image information, a potential error (charged potential error) occurs in the surface potential after exposure. As a result, unevenness of density occurs in the developed toner image, so the quality of the image formed on the transfer material degrades.

Figure 11:
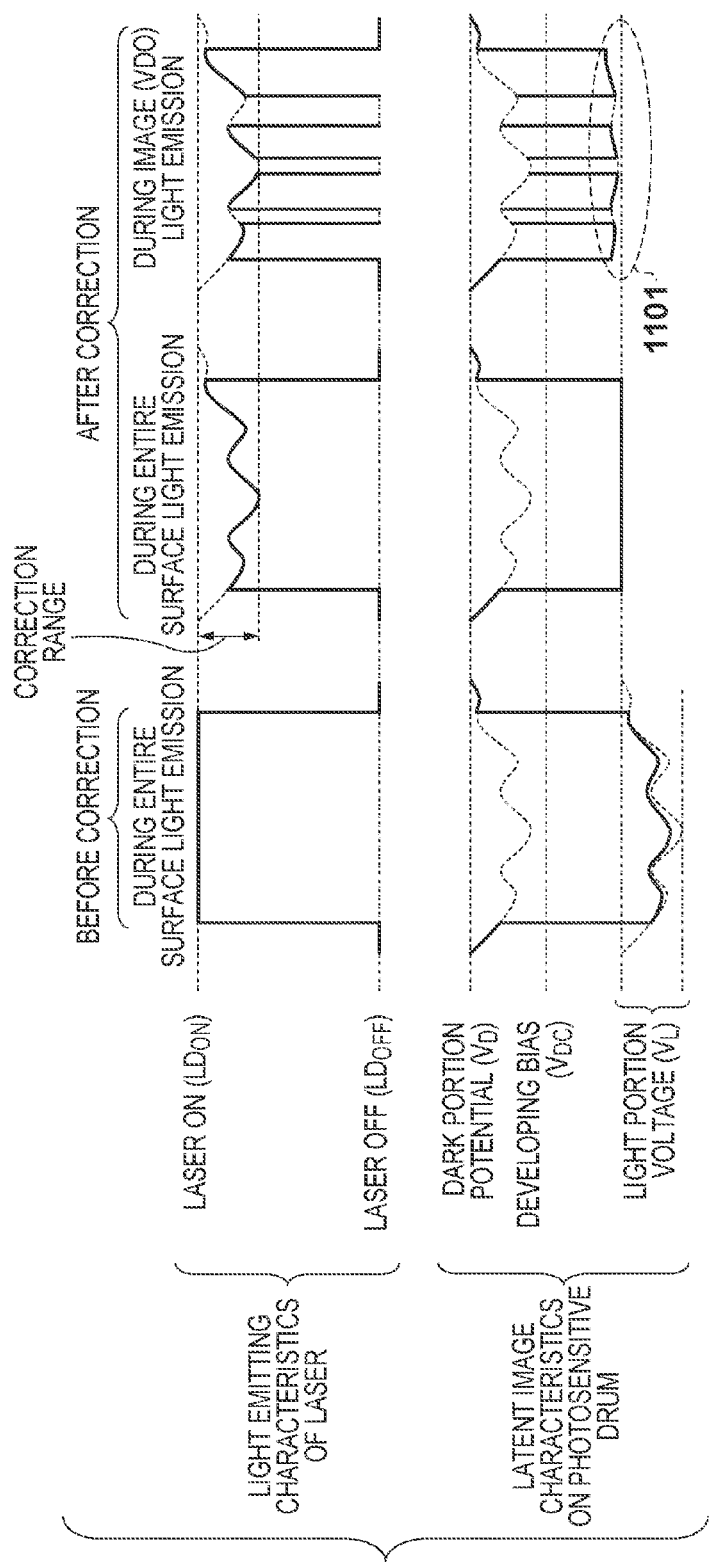
FIG. 11 shows graphs illustrating an example of light power control under which the surface potential of the photosensitive drum 4 is corrected by changing a drive current supplied to the semiconductor laser 11.

Such a potential error due to unevenness of sensitivity of the photosensitive drum 4 is known to be reduced by appropriately adjusting the light power of a laser beam output from the semiconductor laser 11 onto the photosensitive drum 4, as described above. FIG. 11 shows graphs illustrating an example of light power control under which the magnitude (amplitude) of a drive current supplied to the semiconductor laser 11 is changed in accordance with the sensitivity of the photosensitive drum 4 in the main scanning direction to correct the surface potential of the photosensitive drum 4. FIG. 11 shows the light emitting characteristics of the semiconductor laser 11 (the power of light from the semiconductor laser 11) and the latent image characteristics on the photosensitive drum 4 before and after correction of unevenness of sensitivity.

FIG. 11 also shows the characteristics during entire surface light emission and image (VDO) light emission. Entire surface emission corresponds herein to the case wherein the semiconductor laser 11 emits light in accordance with a drive current supplied to the semiconductor laser 11 without modulating this drive current in the image region on the surface of the photosensitive drum 4. This means that a drive current is continuously supplied to the semiconductor laser 11 in entire surface light emission. Hence, in entire surface light emission, the power of light to which the photosensitive member is exposed by the semiconductor laser 11 depends on the magnitude (amplitude) of the drive current. On the other hand, image light emission corresponds herein to the case wherein the semiconductor laser 11 emits light in accordance with a drive current modulated by PWM (Pulse Width Modulation) in accordance with image information in the image region on the surface of the photosensitive drum 4. This means that a drive current having undergone pulse width modulation is continuously supplied to the semiconductor laser 11 in image light emission. Hence, in image light emission, the power of light to which the photosensitive member is exposed by the semiconductor laser 11 depends on the magnitude (amplitude) of the drive current, and the pulse width of the drive current, which is determined based on a PWM value corresponding to image information, as will be described later.

Referring to FIG. 11, before correction of unevenness of sensitivity, the magnitude of the drive current is controlled to be constant so that the power of light from the semiconductor laser 11 stays constant. In entire surface light emission, the contrast voltage (=developing bias $V_{DC}$–light portion voltage $V_L$) in the photosensitive drum 4 fluctuates in the main scanning direction of a laser beam emitted by the semiconductor laser 11. This occurs due to unevenness of sensitivity of the photosensitive drum 4. This fluctuation in contrast voltage leads to the occurrence of unevenness of density in the developed toner image. Referring again to FIG. 11, in the characteristics after correction of unevenness of sensitivity, the magnitude of a drive current supplied to the semiconductor laser 11 is changed so that a potential error which depends on unevenness of sensitivity (sensitivity data) of the photosensitive drum 4 is corrected in accordance with this unevenness of sensitivity. As a result, during entire surface light emission, the contrast voltage after the correction is maintained constant, as can be seen from FIG. 11.

Assume that unevenness of sensitivity of the photosensitive drum 4 is corrected in accordance with the sensitivity data of the photosensitive drum 4, and image light emission is performed, as described above. That is, to correct unevenness of sensitivity of the photosensitive drum 4, the magnitude of a drive current supplied to the semiconductor laser 11 is changed in accordance with the sensitivity data, and the pulse width of this drive current is changed in accordance with image information by PWM, as described above. In this case, the surface potential of a portion irradiated with a laser beam from the semiconductor laser 11 fluctuates in the main scanning direction on the photosensitive drum 4, as can be seen from characteristics denoted by reference numeral 1101 in FIG. 11. That is, the contrast voltage of the photosensitive drum 4 after correction remains uneven in the main scanning direction and therefore has an error (this error will also be referred to as a "residual correction error" hereinafter), as can be seen from FIG. 11. This occurs due to a change in light emitting response of the semiconductor laser 11 when the magnitude of a drive current applied to the semiconductor laser 11 is changed under light power control, as will be described later.

Figure 12:
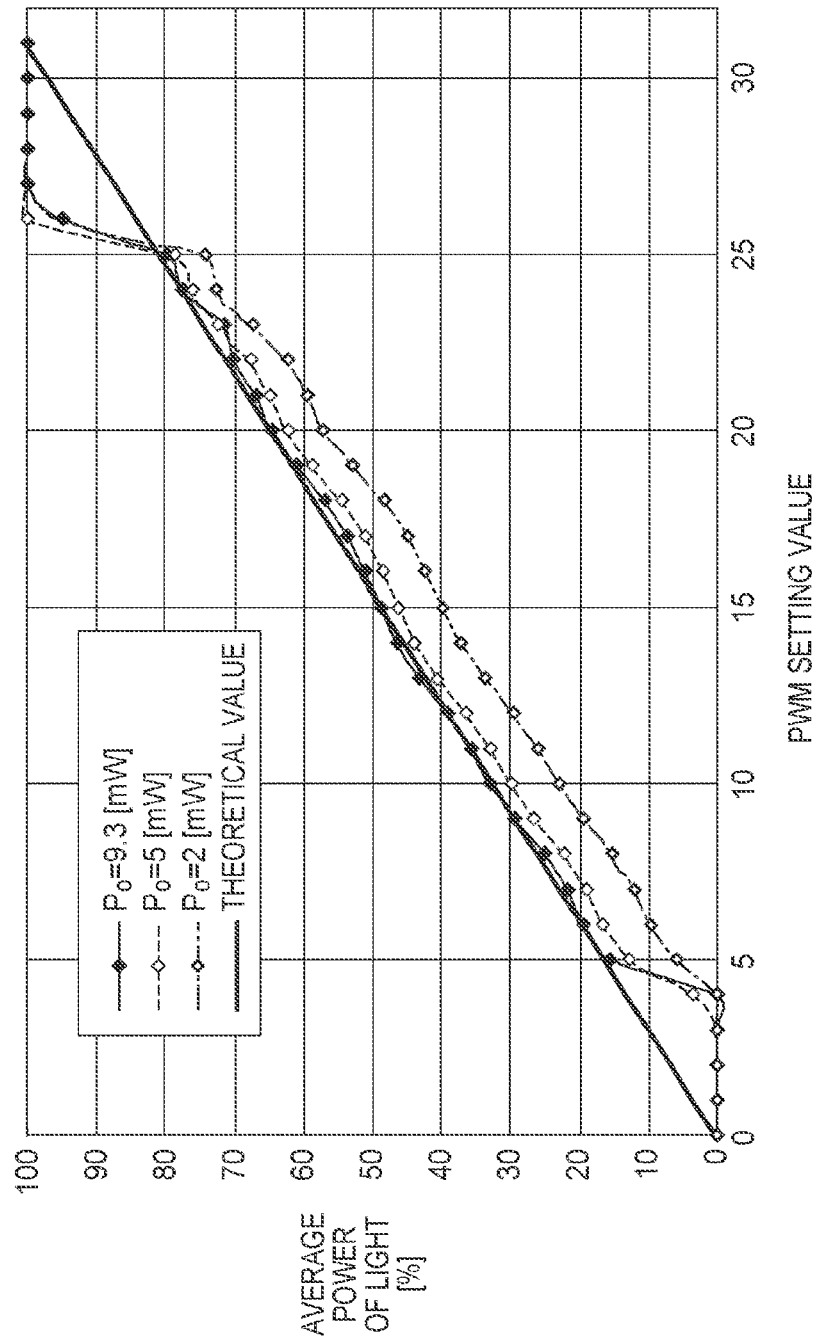
FIG. 12 is a graph illustrating an example of the light emitting response of the semiconductor laser 11.

FIG. 12 is a graph illustrating an example of the response characteristics of the semiconductor laser 11. Referring to FIG. 12, the rated value of the power of light from the semiconductor laser 11 is 10 mW. Referring again to FIG. 12, the abscissa indicates the PWM setting value (PWM value) corresponding to a drive current applied to the semiconductor laser 11, and the ordinate indicates the average power of light when the semiconductor laser 11 emits light in accordance with the drive current having undergone PWM using each PWM setting value.

FIG. 12 illustrates the case wherein a quantization value of 32 levels (0 to 31) quantized using 5 bits is used as the PWM value. This PWM value is used to modulate the drive current. The drive current exhibits a rectangular wave having a predetermined frequency, and its waveform is shaped to have a duty ratio corresponding to the PWM value, thereby performing its PWM. As the PWM value increases, the time for which the drive current is supplied prolongs, so the total amount of a drive current supplied to the semiconductor laser 11 in accordance with the pulse of the drive current increases. As a result, the larger the PWM value, the larger the power of light from the semiconductor laser 11 also becomes, as shown in FIG. 12.

Also, FIG. 12 shows three types of response characteristics corresponding to the case wherein drive currents having different magnitudes (amplitudes) are applied to the semiconductor laser 11, together with their theoretical values. Each of these three types of response characteristics represents the average power of light obtained by normalizing the average power of light corresponding to each PWM value using an average power of light (maximum power of light) $P_o$ corresponding to the maximum value (a PWM value=31 corresponding to an average power of light=100%) of the PWM value. FIG. 12 shows the response characteristics when the maximum power of light $P_o$ is determined as 9.3 mW, 5 mW, and 2 mW, depending on the magnitude (amplitude) of the drive current. Note that FIG. 12 also shows an ideal power of light (ideal response characteristics for each PWM value) determined depending on the magnitude of the drive current as a theoretical value.

As can be seen from FIG. 12, when the semiconductor laser 11 performs image light emission (that is, when the pulse width of the drive current is changed in accordance with a PWM value corresponding to image information), an error occurs between the power of light corresponding to each PWM value and its theoretical value, depending on a change in maximum power of light $P_o$. As can also be seen from FIG. 12, when the maximum power of light $P_o$ is different, an error having a different magnitude occurs. This means that when the semiconductor laser 11 performs image light emission, the power of light relative to the maximum power of light, which is determined based on the PWM value, changes depending on the magnitude of the drive current. That is, when the magnitude of a drive current supplied to the semiconductor laser 11 is changed, the light emitting response of the semiconductor laser 11 changes.

As described above, when the magnitude of a drive current supplied to the semiconductor laser 11 is changed under light power control based on sensitivity data, the light emitting response of the semiconductor laser 11 changes. Especially when the drive current is modulated using the PWM value to perform image light emission, the power of light relative to the maximum power of light, which is determined based on the PWM value, changes depending on the magnitude of the drive current, so an error occurs with respect to the amount of light to be set under normal circumstances. Hence, even when an error of the surface potential of the photosensitive drum 4 due to its unevenness of sensitivity is reduced by controlling the magnitude of the drive current, an error occurs in the light power of a laser beam incident on the photosensitive drum 4. As a result, an error (unevenness of potential) of the surface potential of the photosensitive drum 4 due to its unevenness of sensitivity cannot be sufficiently reduced and remains, so it may lead to degradation in image quality.

Method of Correcting Unevenness of Potential of Photosensitive Drum 4

As described above, when the semiconductor laser 11 performs image light emission by one-time exposure using a drive current having its magnitude adjusted in accordance with a sensitivity correction value so as to correct an error of the surface potential of the photosensitive drum 4, this error remains due to the above-mentioned change in light emitting response, as described above. This makes it impossible to sufficiently correct unevenness of potential of the photosensitive drum 4. In this embodiment, to sufficiently reduce the above-mentioned error of the surface potential of the photosensitive drum 4, which remains due to a change in light emitting response of the semiconductor laser 11, each region on the surface of the photosensitive drum 4 is exposed twice by the first and second exposure operations. In the first exposure operation, the photosensitive drum 4 is irradiated with a laser beam (main beam) from a laser light source in accordance with a drive current corresponding to image information to form a latent image corresponding to the image information on the surface of the photosensitive drum 4. Also, in the second exposure operation, the photosensitive drum 4 is irradiated with a laser beam from a laser light source in accordance with a drive current corresponding to a sensitivity correction value for the photosensitive drum 4 to reduce an error of the surface potential of the photosensitive drum 4.

In this embodiment, more specifically, a first laser light source (first light source) which outputs a main beam, and a second laser light source (second light source) which outputs a sub-beam are employed. As for a drive current supplied to the first laser light source, the magnitude of the drive current is maintained constant without changing it in accordance with a sensitivity correction value according to which a potential error of the photosensitive drum 4 due to its unevenness of sensitivity is reduced. That is, for each main scanning line, while the amplitude of a drive current (pulse signal) adjusted by APC is maintained constant without changing it in accordance with the sensitivity correction value, PWM based on image information is performed for the drive current. This prevents the light emitting response of a laser light source which outputs a laser beam corresponding to image information from changing with a change in magnitude of a drive current pulse.

On the other hand, as for a drive current supplied to the second laser light source, the magnitude (amplitude) of the drive current is changed for each main scanning position at which the photosensitive drum 4 is irradiated with a laser beam, in accordance with a sensitivity correction value according to which unevenness of sensitivity of the photosensitive drum 4 is reduced. Upon this operation, the second light source irradiates the photosensitive drum 4 with a laser beam in light power in which a potential error of the photosensitive drum 4 due to its unevenness of sensitivity is reduced.

In this case, a drive current supplied to the second laser light source does not undergo PWM in accordance with image information in forming an image, so latent image characteristics during entire surface light emission are obtained instead of obtaining those during image light emission (note that non-execution of PWM corresponds to the case wherein a PWM value=31 and an average power of light=100% in FIG. 12), as shown in FIG. 11. Also, even when the magnitude of the drive current is changed, that is, the power of light from the laser light source is adjusted in accordance with the sensitivity correction value for the photosensitive drum 4, no problem resulting from the factors associated with the light emitting response of the laser light source, as described above, is posed unless the adjusted power of light is relatively changed more in accordance with the PWM value.

In this way, in this embodiment, the first exposure operation which employs the first laser light source and the second exposure operation which employs the second laser light source are used in combination, and the photosensitive drum 4 is irradiated with laser beams to expose the photosensitive drum 4. These laser light sources irradiate the same main scanning line (same region) on the surface of the photosensitive drum 4 with light beams in superposition. According to this embodiment, in the first exposure operation, for each main scanning line (each region), the magnitude of the drive current pulse modulated by PWM is not changed, so the light emitting response of the laser light source remains the same. Hence, no error occurs in the power of light from the laser light source due to a change in light emitting response of the laser light source. On the other hand, in the second exposure operation, the magnitude of the drive current is changed in accordance with the sensitivity correction value so as to reduce unevenness of sensitivity of the photosensitive drum 4. However, since PWM is not executed in the second exposure operation, this change in the magnitude of the drive current does not influence the light emitting response of the laser light source at all. Therefore, an error of the surface potential of the photosensitive drum 4 due to its unevenness of sensitivity, which remains due to a change in light emitting response of the laser light source, can be sufficiently reduced by executing the first and second exposure operations in combination in this embodiment, compared to a reduction in error when image light emission is performed by one-time exposure, as described above. The operation of the optical scanning apparatus 2 according to this embodiment will be described in more detail below.

Configuration and Operation of Laser Driving Device 12

Figure 4:
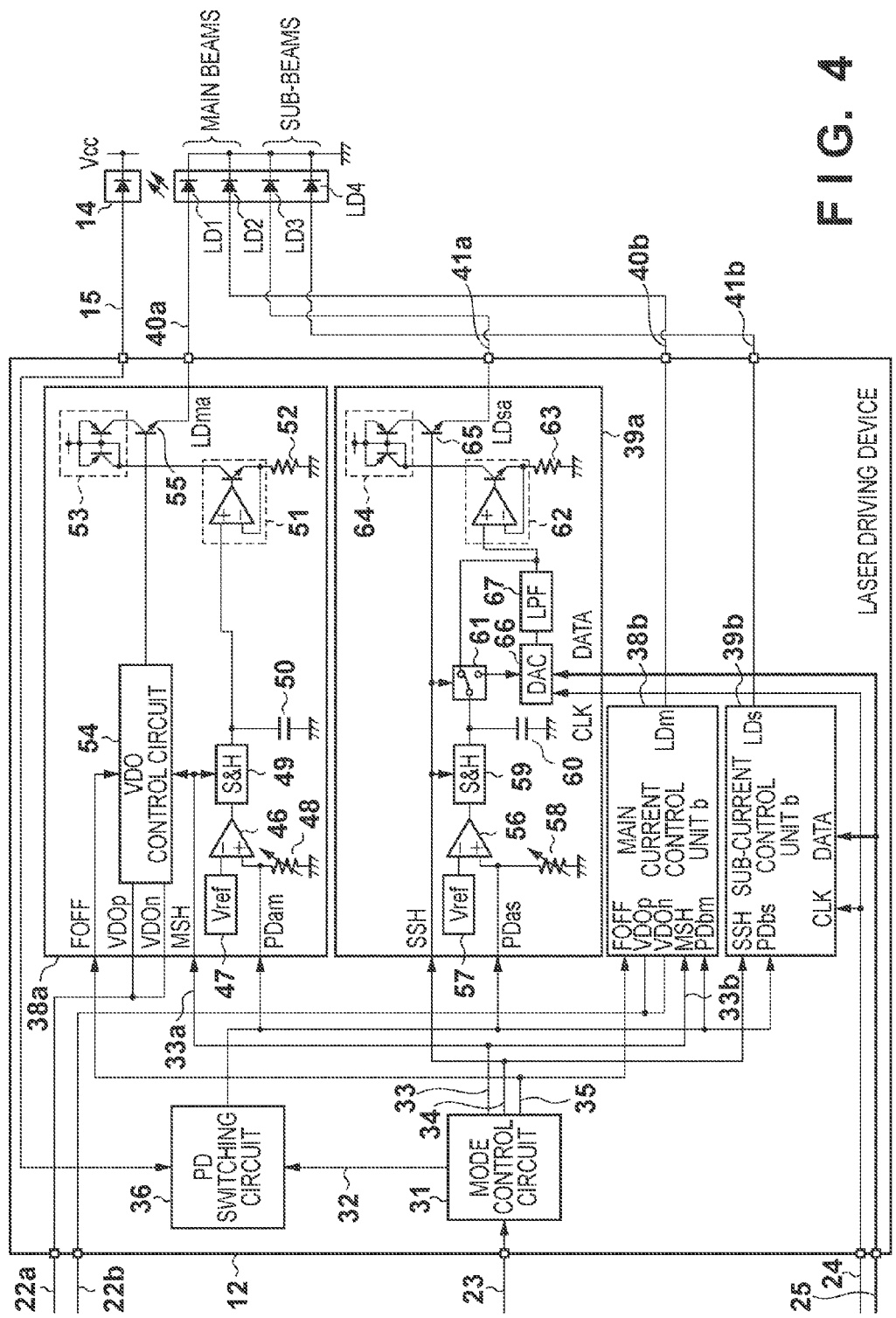
FIG. 4 is a circuit diagram showing the configuration of a laser driving device 12 according to the embodiment of the present invention.

The configuration and operation of the laser driving device 12 will be described next with reference to FIGS. 4 and 5. In this embodiment, the semiconductor laser 11 is a multibeam laser which includes four laser diodes LD1 to LD4 corresponding to laser light sources, that is, has a four-beam configuration, as shown in FIG. 4. The semiconductor laser 11 includes the laser diodes LD1 and LD2 which emit main beams, and the laser diodes LD3 and LD4 which emit sub-beams. Among these laser diodes, the laser diodes LD1 and LD3 and the laser diodes LD2 and LD4 constitute different groups of laser light sources. Laser light sources included in these different groups of laser light sources irradiate main scanning lines (regions) that are different between the different groups of laser light sources on the surface of the photosensitive drum 4 with laser beams in superposition. In this manner, the laser diodes LD1 to LD4 are arrayed in the semiconductor laser 11 so that laser beams from the laser diodes LD1 and LD3 scan the same main scanning line, and those from the laser diodes LD2 and LD4 scan the same main scanning line. Also, the main scanning line scanned by the laser diodes LD1 and LD3 and that scanned by the laser diodes LD2 and LD4 are different in the sub-scanning direction. However, as will be described later, the semiconductor laser 11 need not always include a plurality of groups of laser light sources, and may include only one group of laser light sources. In the latter case as well, the same advantage as in this embodiment can be obtained.

The laser driving device 12 is connected to the image control device 3 (FIG. 1) and the PD unit 14 (FIG. 2) in the optical scanning apparatus 2, and drives the laser diodes LD1 to LD4 provided in the semiconductor laser 11 as laser light sources, based on signals input from the image control device 3 and PD unit 14. The laser driving device 12 can control the light emitting states of the laser diodes LD1 to LD4 by controlling drive currents 40a, 40b, 41a, and 41b supplied (applied) to the laser diodes LD1 to LD4, respectively, as will be described later. In this manner, in this embodiment, the laser driving device 12 functions as an example of a control unit which controls a laser light source.

The laser driving device 12 includes a main current control unit 38a (main current control unit a) and sub-current control unit 39a (sub-current control unit b) which provide drive currents to the laser diodes LD1 and LD3 that emit a main beam and sub-beam, respectively, that scan the same main scanning line. In this case, the main current control unit 38a supplies a drive current to the laser diode LD1, and the sub-current control unit 39a supplies a drive current to the laser diode LD3. The laser driving device 12 also includes a main current control unit 38b and sub-current control unit 39b as current control units corresponding to the laser diodes LD2 and LD4, respectively. In this case, the main current control units 38a and 38b exemplify a first current providing unit, and the sub-current control units 39a and 39b exemplify a second current providing unit. Note that the configurations and operations of the main current control unit 38b and sub-current control unit 39b are the same as those of the main current control unit 38a and sub-current control unit 39a, respectively, and a description thereof will not be given below as much as possible.

The laser driving device 12 further includes a mode control circuit 31 and PD switching circuit 36, as shown in FIG. 4. The laser driving device 12 receives image (VDO) signals 22a and 22b, laser control signals 23, a clock (CLK) signal 24, and current control data (DATA) 25 from the image control device 3, and receives a PD current 15 from the PD unit 14. The laser control signals 23 include a light power control signal 23a and two channel selection signals 23b and 23c, and are input to the mode control circuit 31 in the laser driving device 12, as shown in FIG. 5. The image control device 3 controls the operating state (operating mode) of the laser driving device 12 based on a combination of signal values of the signals included in the laser control signals 23. That is, the mode control circuit 31 determines the operating mode to be used in the laser driving device 12, in accordance with a combination of signal values of the signals 23a to 23c included in the laser control signals 23.

In this embodiment, operating modes (reference numeral 501 in FIG. 5) that can be selected by the mode control circuit 31 include, for example, light power control (APC) modes (LDAm_APC, LDBm_APC, LDAs_APC, and LDBs_APC) for the laser diodes LD1 to LD4, respectively, a forcible turn-off mode (OFF), and an image light emission mode (VDO). FIG. 5 shows the operation of the laser driving device 12 in about one cycle in which a laser beam from the semiconductor laser 11 performs main scanning on the surface of the photosensitive drum 4. Note that one main scanning cycle corresponds to a cycle in which BD signals 21 are detected. The APC modes for the laser diodes LD1 to LD4 and the forcible turn-off mode are used in a non-image formation duration, in which no image is formed, of one scanning cycle in which the laser beam scans the photosensitive drum 4, as shown in FIG. 5. The image light emission mode is used in an image formation duration, in which an image is formed, of one scanning cycle in which the laser beam scans the photosensitive drum 4.

The mode control circuit 31 controls the main current control units 38a and 38b and sub-current control units 39a and 39b based on main sampling signals (MSH) 33, sub-sampling signals (SSH) 34, and forcible turn-off signals (FOFF) 35 so that the laser driving device 12 operates in the determined operating mode.

The PD unit 14 outputs, to the laser driving device 12, a PD current 15 corresponding to the intensity (light emitting intensity) of a laser beam emitted by each of the laser diodes LD1 to LD4 in the semiconductor laser 11. The PD current 15 input to the laser driving device 12 is supplied to the PD switching circuit 36. The PD switching circuit 36 switches the destination, to which the PD current 15 input from the PD unit 14 is supplied, between the main current control units 38a and 38b and sub-current control units 39a and 39b, in accordance with the output mode determined under the control of the mode control circuit 31.

The PD switching circuit 36 determines an output mode in accordance with PD switching signals 32 input from the mode control circuit 31. The mode control circuit 31 changes the PD switching signals 32, that is, PD switching signals 32a and 32b output to the PD switching circuit 36 in accordance with the operating mode determined in the foregoing way, as shown in FIG. 5. As can be seen from FIG. 5, the output mode (reference numeral 502 in FIG. 5) corresponding to the destination to which the PD current 15 is supplied from the PD switching circuit 36 is switched in response to changes in PD switching signals 32a and 32b sent from the mode control circuit 31 to the PD switching circuit 36. In this embodiment, the PD switching circuit 36 sets the destination to which the PD current 15 is supplied from the PD switching circuit 36 to one of the four current control units. In this way, the PD switching circuit 36 determines an output mode in accordance with a combination of signal values of the PD switching signals 32a and 32b from the mode control circuit 31.

The operations of the main current control units 38a and 38b and sub-current control units 39a and 39b will be described below with reference to a timing chart shown in FIG. 5, together with a description of the operation of the laser driving device 12 in each operating mode (reference numeral 501 in FIG. 5).

(1) APC Modes for Main Beams (LDAm_APC and LDBm_APC)

In the APC mode (LDAm_APC) for the laser diode LD1 which emits a main beam, a drive current supplied from the main current control unit 38a to the laser diode LD1 is controlled so that the power of light from the laser diode LD1 is controlled to that determined in advance. Note that the same control is performed in the APC mode (LDBm_APC) for the laser diode LD2, and a description of the main current control unit 38b for the laser diode LD2 will not be given.

Upon selecting the APC mode for the laser diode LD1, the mode control circuit 31 operates in the following way. The mode control circuit 31 sets a sample/hold (S&H) circuit 49 in the main current control unit 38a in a sample (enabled) state based on a main sampling signal 33a. Also, the mode control circuit 31 controls a VDO control circuit 54 based on a forcible turn-off signal 35a to forcibly sets, in an ON (light emitting) state, the laser diode LD1 to which a drive current is supplied from the main current control unit 38a. The VDO control circuit 54 forcibly turns on a transistor 55 shown in FIG. 4 so that the laser diode LD1 emits light. Moreover, the mode control circuit 31 controls the PD switching circuit 36 based on a PD switching signal 32 to switch, to the main current control unit 38a, the destination (reference numeral 502 in FIG. 5) to which the PD current 15 is supplied from the PD switching circuit 36. Upon this operation, the PD current 15 input from the PD unit 14 starts to be supplied to the main current control unit 38a as a PD current PDam.

In this operating mode, among the laser diodes LD1 to LD4 of the semiconductor laser 11, only the laser diode LD1 emits light because a drive current is supplied to only the laser diode LD1. Therefore, the PD unit 14 outputs a PD current 15 corresponding to the intensity (light emitting intensity) of a laser beam (main beam) emitted by the laser diode LD1. In this operating mode, the PD current 15, that is, the PD current PDam input to the main current control unit 38a via the PD switching circuit 36 is converted into a voltage by a variable resistor 48. The converted voltage is applied to a comparator 46. The comparator 46 compares the applied voltage with a reference voltage which is applied from a reference voltage generator 47 and corresponds to power of light (light power control value $P_{mtgt}$) determined in advance. The comparator 46 outputs, as the comparison result, a signal corresponding to the difference between those voltages to the sample/hold circuit 49 in a sample (enabled) state, thereby changing the voltage of a hold capacitor 50. The hold capacitor 50 is charged at a time constant unique to itself.

The voltage of the hold capacitor 50 is input to the input terminal of a current driver 51. The current driver 51 operates so that a current corresponding to a driving resistance 52 and the voltage of the hold capacitor 50 is output from a mirror circuit 53 to the laser diode LD1. Note that one transistor (on the input side) in the mirror circuit 53 is connected to the current driver 51, while the other transistor (on the output side) is connected to the transistor 55. After the current value of the current supplied from the current driver 51 to the mirror circuit 53 is multiplied by a predetermined mirror ratio, this current is supplied to the transistor 55. Since the transistor 55 is forcibly turned on by the VDO control circuit 54, the current from the mirror circuit 53 is supplied to the laser diode LD1 as the drive current 40a, that is, a drive current LDma.

When the laser diode LD1 is supplied with the drive current 40a, it emits light in power corresponding to this drive current, and outputs a laser beam. The laser beam output from the laser diode LD1 is detected by the PD unit 14, and a PD current 15 corresponding to the intensity of the laser beam is input to the main current control unit 38a as the PD current PDam. Further, the comparator 46 compares the voltage obtained by converting the PD current 15 with the reference voltage, as described above. The main current control unit 38a controls a drive current supplied to the laser diode LD1 so that the voltage obtained by converting the PD current 15 comes close to the reference voltage, in accordance with the comparison result. In this way, the laser driving device 12 controls the light power of the laser diode LD1 to light power $P_{mtgt}$ determined in advance.

(2) Forcible Turn-Off Mode (OFF)

Figure 5:
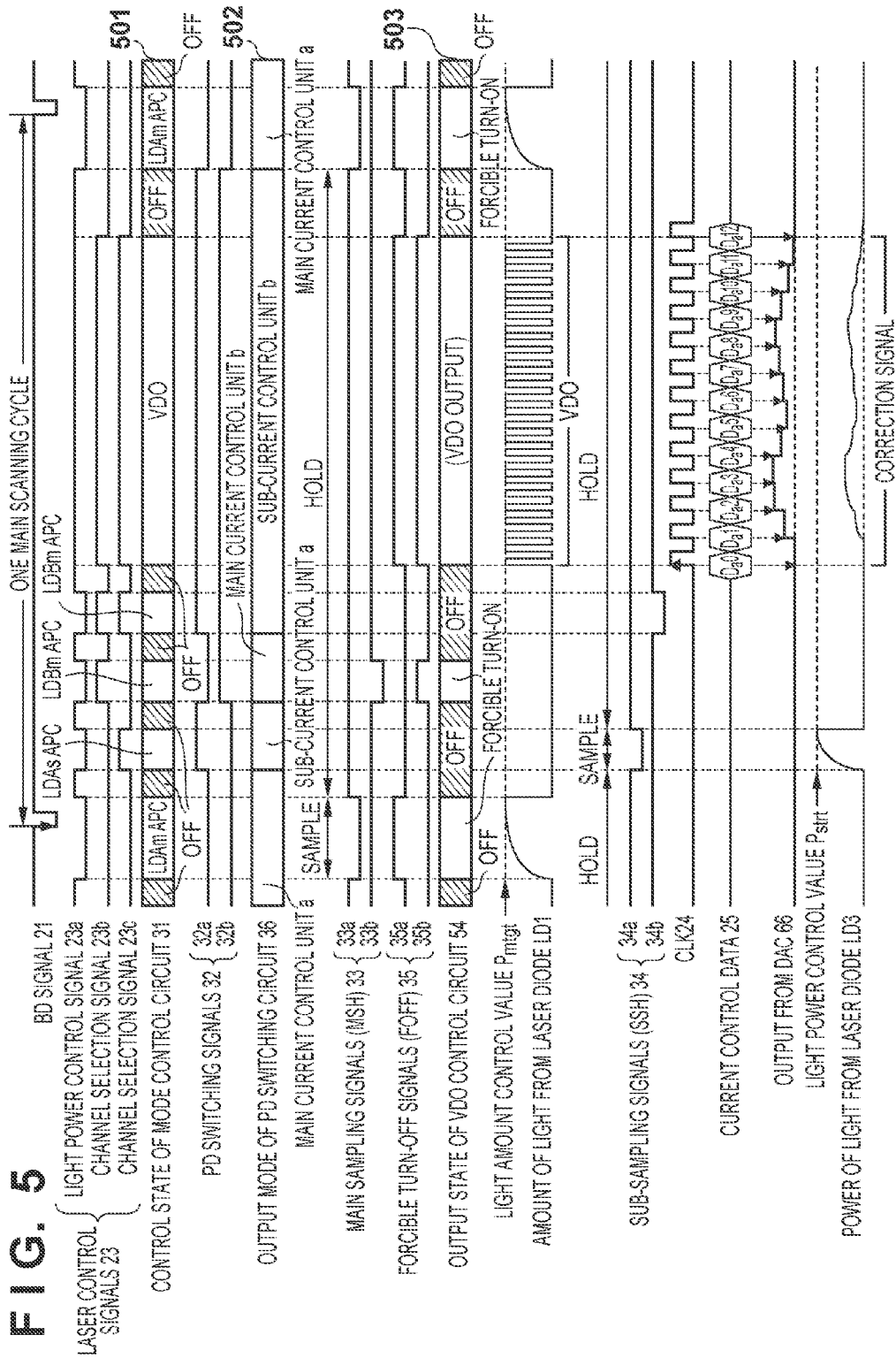
FIG. 5 is a timing chart showing the timings of the operations of the laser driving device 12 according to the embodiment of the present invention.

In the laser driving device 12, after the APC mode (LDAm_APC) for the laser diode LD1 is executed, the mode control circuit 31 selects a forcible turn-off mode (OFF), as shown in FIG. 5. Upon selecting this operating mode, the mode control circuit 31 operates in the following way. The mode control circuit 31 controls the VDO control circuit 54 based on a forcible turn-off signal 35a to forcibly set the laser diode LD1 in an OFF state. More specifically, the mode control circuit 31 turns off the forcible turn-off signal 35a to control the VDO control circuit 54 so as to switch the state of the transistor 55 to an OFF state. This cuts off the provision of the drive current 40a from the mirror circuit 53 to the laser diode LD1, so the laser diode LD1 changes to an OFF state.

Also, in the main current control unit 38a, upon switching the operating mode from the APC mode for the laser diode LD1 to the forcible turn-off mode, the mode control circuit 31 sets the sample/hold circuit 49 in a hold (disabled) state based on the main sampling signal 33a. This keeps inputting the voltage of the charged hold capacitor 50 to the current driver 51. As a result, the laser diode LD1 emits light in power adjusted by APC of (1) in an image light emission mode (VDO) (to be described later).

(3) APC Modes for Sub-Beams (LDAs_APC and LDBs_APC)

In the APC mode (LDAs_APC) for the laser diode LD3 which emits a sub-beam, a drive current supplied from the main current control unit 38a to the laser diode LD3 is controlled so that the power of light from the laser diode LD3 is controlled to that determined in advance. Note that the same control is performed in the APC mode (LDBs_APC) for the laser diode LD4, and a description of the main current control unit 38b for the laser diode LD2 will not be given.

Upon selecting the APC mode for the laser diode LD3, the mode control circuit 31 operates in the following way. The mode control circuit 31 sets a sample/hold (S&H) circuit 59 in the sub-current control unit 39a in a sample (enabled) state based on a sub-sampling signal 34a, and switches a switching circuit 61 so that the sample/hold circuit 59 and the current driver 51 are connected to each other. Also, the transistor 55 is forcibly turned on in accordance with the sub-sampling signal 34a. Note that as can be seen from FIG. 4, when the sub-current control unit 39a performs APC, the state of the circuit in the sub-current control unit 39a is equivalent to that when the main current control unit 38a performs APC. Hence, the sub-current control unit 39a executes an operation equivalent to that of APC by the main current control unit 38a described above. As a result, a drive current applied from the laser driving device 12 to the laser diode LD3 is determined so that the power of light from the laser diode LD3 is equal to power of light $P_{mtgt}$ determined in advance, as shown in FIG. 5.

(4) Image Light Emission Mode (VDO)

When the mode control circuit 31 selects the image light emission mode, the sample/hold circuit 49 of the main current control unit 38a and the sample/hold circuit 59 of the sub-current control unit 39a change to a hold (disabled) state in accordance with the main sampling signal 33a and sub-sampling signal 34a, respectively. In the main current control unit 38a, the VDO control circuit 54 outputs, to the transistor 55, a VDO signal 22a corresponding to image information supplied from the image control device 3. Also, in the sub-current control unit 39a, the sub-sampling signal 34a switches the state of the switching circuit 61 to that in which the sample/hold circuit 59 and a digital-to-analog conversion circuit (DAC) 66 are connected to each other.

In the image light emission mode, the current driver 51 of the main current control unit 38a supplies, to the mirror circuit 53, a current which is determined by APC and corresponds to the driving resistance 52 and the voltage of the hold capacitor 50. The mirror circuit 53 changes the current input from a current driver 62 at a predetermined mirror ratio, and supplies it to the laser diode LD1 as a drive current LDma. This drive current is supplied from the mirror circuit 53 to the laser diode LD1 via the transistor 55. At this time, the transistor 55 switches the drive current supplied from the mirror circuit 53 to the laser diode LD1, in accordance with a VDO signal 22a supplied via the VDO control circuit 54. This implements PWM corresponding to the VDO signal 22a. Note that the magnitude of the drive current is constant at a current level determined by APC. The drive current modulated by PWM is supplied to the laser diode LD1 so that the laser diode LD1 irradiates the photosensitive drum 4 with a laser beam (main beam) corresponding to image information.

Also, in the sub-current control unit 39a, the voltage of a hold capacitor 60 determined by APC is applied to the DAC 66 via the switching circuit 61 as a reference voltage. Note that the reference voltage corresponds to power of light of 100% in FIG. 12. The DAC 66 receives the clock (CLK) signal 24 and the current control data (DATA) 25 from the image control device 3. The DAC 66 converts the current control data 25 from a digital signal into an analog signal and outputs it in accordance with the timing of the input clock signal 24. The current control data 25 corresponds herein to a correction value used to reduce unevenness of potential characteristics for each region on the surface of the photosensitive drum 4.

The analog signal which is output from the DAC 66 and corresponds to the correction value is input to the current driver 62 via a lowpass filter (LPF) 67. The current driver 62 supplies a current corresponding to a driving resistance 63 and the input from the lowpass filter 67 to a mirror circuit 64. The mirror circuit 64 changes the current input from the current driver 62 at a predetermined mirror ratio, and supplies it to the laser diode LD3 as a drive current LDsa. This drive current is supplied to the laser diode LD3 via a transistor 65 turned on in accordance with the sub-sampling signal 34a. The drive current supplied to the laser diode LD3 changes in accordance with the current control data 25 (sensitivity correction value) so that the laser diode LD3 irradiates the photosensitive drum 4 with a laser beam (sub-beam) in light power corresponding to the sensitivity correction value, as shown in FIG. 5.

In the image light emission mode, laser beams (main beam and sub-beam) output from the laser diode LD1 (first laser light source) and the laser diode LD3 (second laser light source) onto the photosensitive drum 4 scan the same main scanning line on the surface of the photosensitive drum 4, as will be described later. This makes it possible to expose the photosensitive drum 4 without changing a drive current supplied to the laser diode LD1 which outputs a laser beam corresponding to image information. This also makes it possible to sufficiently reduce an error of the surface potential of the photosensitive drum 4 due to its unevenness of sensitivity using a laser beam emitted by the laser diode LD3. Note that, in the image light emission mode, the operations of the laser diodes LD2 and LD4 and the main current control unit 38b and sub-current control unit 39b corresponding to them are the same as those of the laser diodes LD1 and LD3 and the main current control unit 38a and sub-current control unit 39a, respectively, and a description thereof will not be given.

Laser Beam Scanning Method Corresponding to Exposure Scheme

A scanning method corresponding to the exposure scheme using main beams and sub-beams output from the laser diodes LD1 to LD4 of the semiconductor laser 11 will be described next with reference to FIGS. 6A, 6B, 7, and 8.

In the image forming apparatus 1, a contrast voltage is generated between different potentials on the surface of the photosensitive drum 4 depending on the difference in exposure scheme. More specifically, a contrast voltage $V_{cont}$ is generated between potentials different between background exposure and image exposure. In developing the formed electrostatic latent image, toner in an amount corresponding to the contrast voltage $V_{cont}$ adheres to the surface of the photosensitive drum 4. To prevent the occurrence of unevenness of density in the developed image, it is necessary to maintain the contrast voltage $V_{cont}$ constant.

Note that in background exposure, an image is formed on the photosensitive drum 4 by allowing toner to adhere to a portion on the surface of the photosensitive drum 4, which is not irradiated with laser beams from the laser diodes LD1 and LD3, in accordance with image information. In this case, the contrast voltage $V_{cont}$ corresponds to the potential difference between a developing bias $V_{DC}$ and a dark portion potential $V_D$ corresponding to the surface potential of the portion on the surface of the photosensitive drum 4, which is not irradiated with laser beams from the laser diodes LD1 and LD3.

On the other hand, in image exposure, an image is formed on the photosensitive drum 4 by allowing toner to adhere to a portion on the surface of the photosensitive drum 4, which is irradiated with laser beams from the laser diodes LD1 and LD3, in accordance with image information. In this case, the contrast voltage $V_{cont}$ corresponds to the potential difference between a developing bias $V_{DC}$ and a light portion voltage $V_L$ corresponding to the surface potential of the portion on the surface of the photosensitive drum 4, which is irradiated with laser beams from the laser diodes LD1 and LD3.

Figure 6:
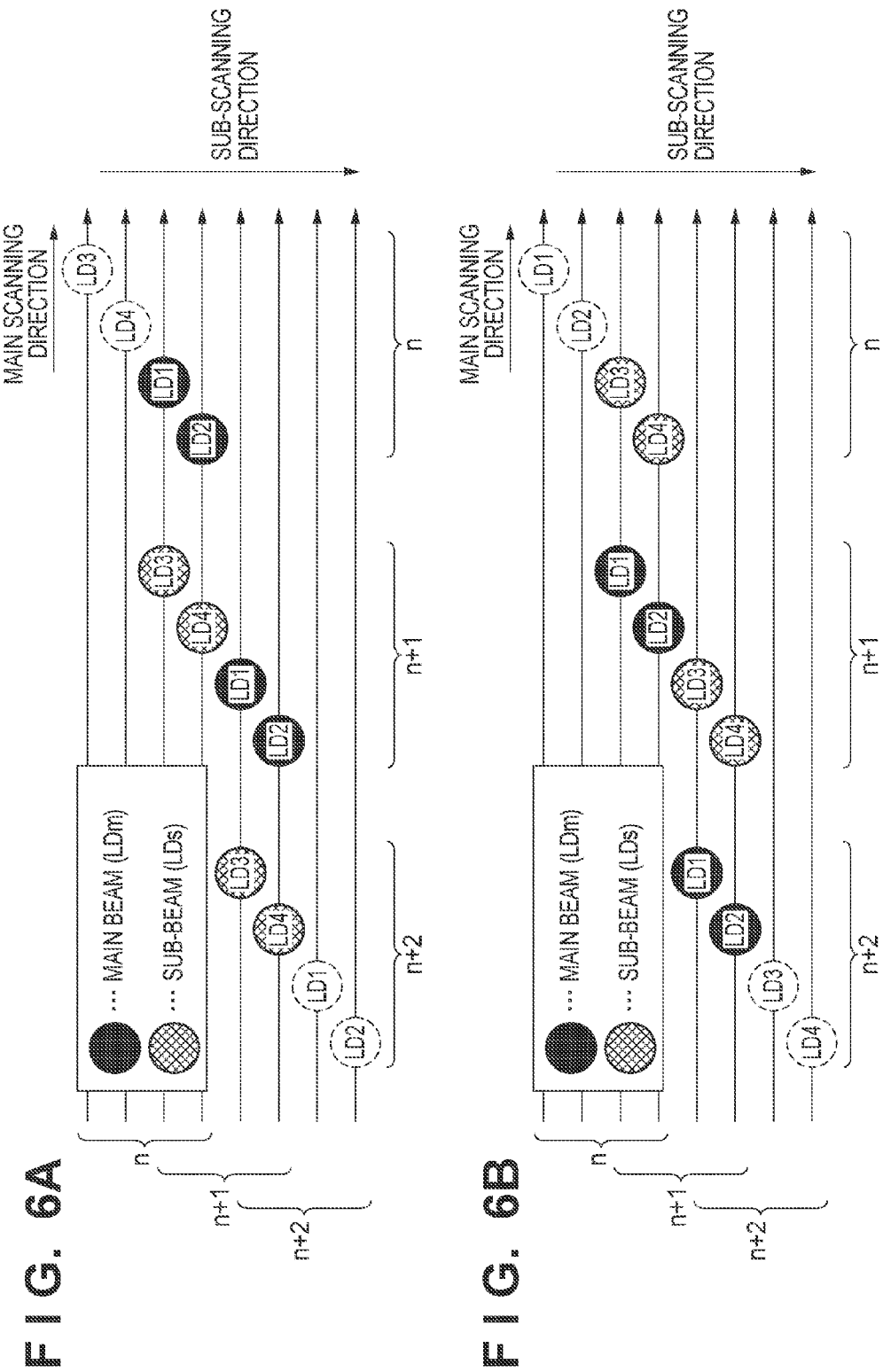
FIGS. 6A and 6B are views showing the orders of use of main beams and sub-beams which irradiate each main scanning line in respective exposure schemes according to the embodiment of the present invention.
Figure 7:
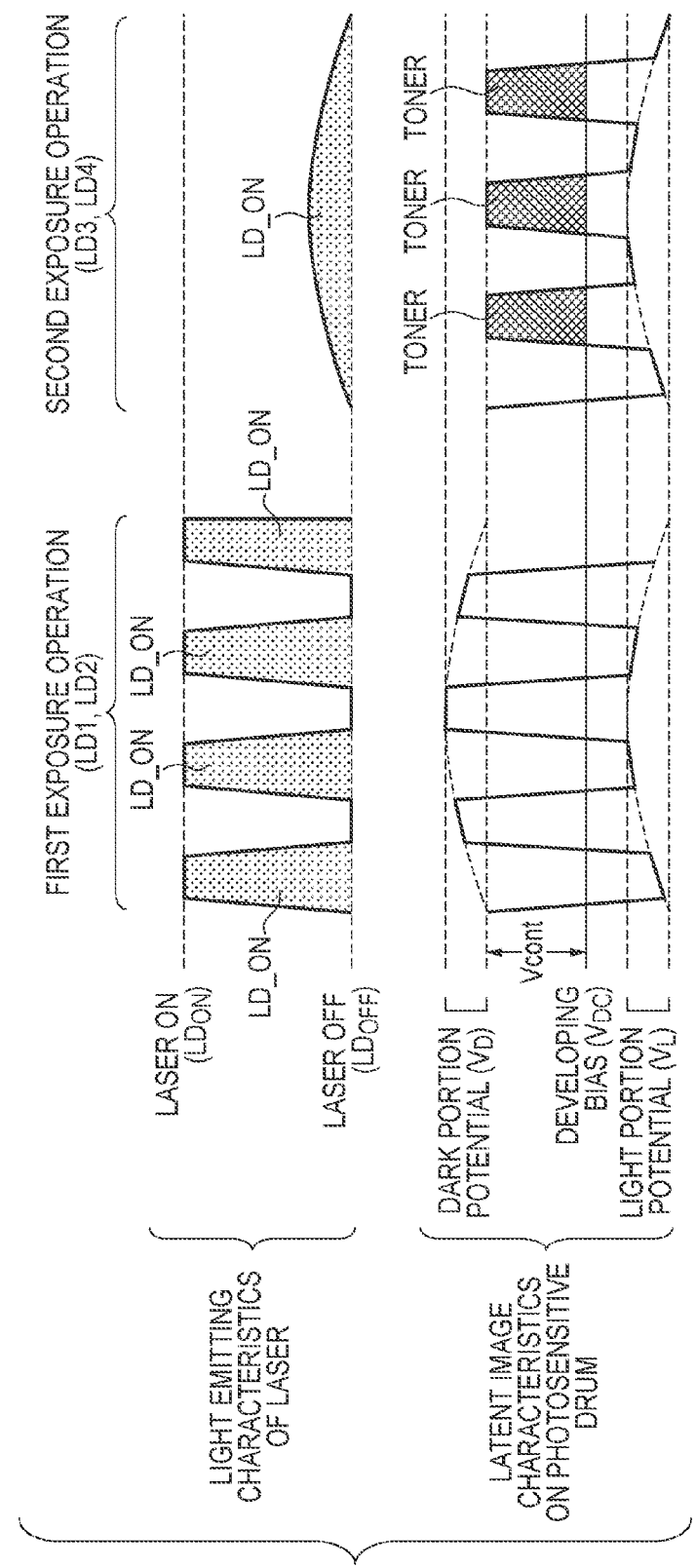
FIG. 7 shows graphs of the light emitting characteristics of a semiconductor laser 11 and the latent image characteristics on a photosensitive drum 4 when exposure is done as background exposure according to the embodiment of the present invention.
Figure 8:
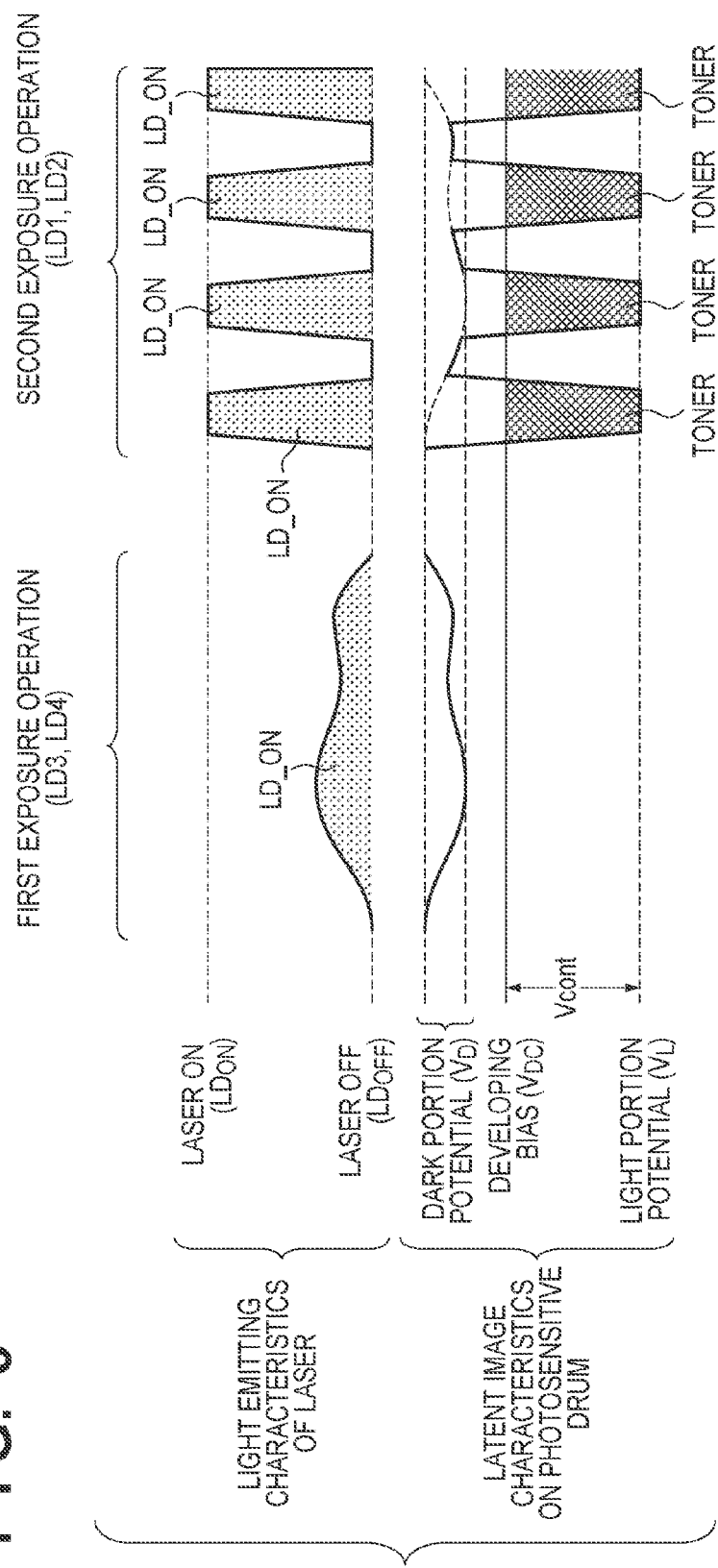
FIG. 8 shows graphs of the light emitting characteristics of the semiconductor laser 11 and the latent image characteristics on the photosensitive drum 4 when exposure is done as image exposure according to the embodiment of the present invention.

In this embodiment, the type of beam to be output onto the photosensitive drum 4 first is selected between a main beam and a sub-beam for each main scanning line, in accordance with whether the image forming apparatus 1 executes background exposure or image exposure. That is, the type of exposure operation to be executed first is selected between a first exposure operation which uses a main beam and a second exposure operation which uses a sub-beam, depending on the exposure scheme. This results from the above-mentioned difference in contrast voltage $V_{cont}$. FIGS. 6A and 6B are views showing the orders of use of main beams and sub-beams which irradiate each main scanning line with in the respective exposure schemes: background exposure and image exposure. FIGS. 6A and 6B show the types of beams which scan the main scanning lines in the nth, (n+1)th, and (n+2)th scanning operations that use main beams and sub-beams from the laser diodes LD1 to LD4. Also, FIGS. 7 and 8 are graphs showing the light emitting characteristics of the semiconductor laser 11 and the latent image characteristics on the photosensitive drum 4 in the first and second exposure operations using different laser light sources for the same main scanning line. Note that FIG. 7 shows the case of background exposure, and FIG. 8 shows the case of image exposure.

The laser diodes LD1 and LD3 included in the same group of laser light sources irradiate the same main scanning line with a main beam and a sub-beam, respectively, as shown in FIGS. 6A and 6B. Also, the laser diodes LD2 and LD4 included in the same group of laser light sources irradiate a main scanning line, different from that irradiated by the laser diodes LD1 and LD3 included in the group of laser light sources different from that including the laser diodes LD2 and LD4, with a main beam and a sub-beam, respectively. Note that in this embodiment, the order of use of a main beam and a sub beam which scan each main scanning line is different depending on the exposure scheme, as shown in FIGS. 6A and 6B.

(Background Exposure)

After the laser diode LD1 or LD2 irradiates each main scanning line with a main beam, the laser diode LD3 or LD4 irradiates this irradiated main scanning line with a sub-beam in superposition, as shown in FIG. 6A. When the laser diode LD1 or LD2 executes the first exposure operation on each main scanning line, a fluctuation (error) corresponding to the main scanning position occurs in the surface potential $V_D$ and $V_L$, depending on unevenness of sensitivity of the photosensitive drum 4, as shown in FIG. 7. As described above, in background exposure, a contrast voltage $V_{cont}$ is generated between a developing bias $V_{DC}$ and a dark portion potential $V_D$. Hence, in background exposure, the potential error that has occurred in the dark portion potential $V_D$ after the first exposure operation which uses a main beam need only be reduced by the second exposure operation which uses a sub-beam.

In this manner, in background exposure, the first exposure operation is executed using a main beam, and the second exposure operation is executed using a sub-beam. When image light emission is performed by the first exposure operation, the light emitting response of the laser light source used changes. An error of the surface potential of the photosensitive drum 4 thus cannot be sufficiently corrected and remains, as described above. In contrast to this, in this embodiment, the first exposure operation does not change the light emitting response of the laser light source used, and the second exposure operation is not influenced by the light emitting response of this laser light source. Therefore, as in this embodiment, exposing each main scanning line twice by the first and second exposure operations makes it possible to reduce an error of the surface potential of the photosensitive drum 4 due to its unevenness of sensitivity (potential characteristics) without allowing this error to remain due to a change in light emitting response of the laser light source used. Also, the following image exposure is done by executing the first and second exposure operations in the order reverse to that in the background exposure, but produces the same advantage as that produced by the background exposure.

(Image Exposure)

After the laser diode LD3 or LD4 irradiates each main scanning line with a sub-beam, the laser diode LD1 or LD2 irradiates this irradiated main scanning line with a main beam in superposition, as shown in FIG. 6B. As described above, in image exposure, a contrast voltage $V_{cont}$ is generated between a developing bias $V_{DC}$ and a light portion voltage $V_L$. Hence, in image exposure, an error of the surface potential of the photosensitive drum 4 due to its unevenness of sensitivity, that occurs in the light portion voltage $V_L$ finally determined by exposure which uses a main beam, need only be reduced in advance by exposure which uses a sub-beam. As shown in FIG. 8, when the laser diode LD3 or LD4 performs the first exposure operation on each main scanning line using a sub-beam, a fluctuation occurs in the dark portion potential $V_D$ on the surface of the photosensitive drum 4, depending on the factors associated with the sub-beam. This corresponds to a fluctuation corresponding to a correction value according to which unevenness of sensitivity of the photosensitive drum 4 is reduced. When the laser diode LD1 or LD2 then performs the second exposure operation on each main scanning line using a main beam, a predetermined light portion voltage $V_L$ is generated.

In this manner, the order of use of a main beam and a sub-beam which scan each main scanning line on the surface of the photosensitive drum 4 is set in accordance with whether the exposure scheme is background exposure or image exposure. Upon this operation, the contrast voltage $V_{cont}$ after exposure stays constant. That is, regardless of the exposure scheme, a potential error of the photosensitive drum 4 due to its unevenness of sensitivity can be reduced, thus suppressing degradation in image quality.

Method of Generating Sensitivity Correction Value

A sensitivity correction value, that is, current control data (DATA) 25 to be input to the sub-current control units 39a and 39b is generated by the image control device 3. The image control device 3 can calculate a sensitivity correction value by an arithmetic operation to be described below, based on sensitivity data measured in advance using the photosensitive drum 4 provided in the image forming apparatus 1. This sensitivity data can be stored in a nonvolatile storage device such as an EEPROM provided in the laser driving device 12 or photosensitive drum 4. If this storage device is provided in, for example, the photosensitive drum 4, the image control device 3 need only read out the sensitivity data from this storage device and newly calculate a sensitivity correction value based on the readout sensitivity data every time replacement of the photosensitive drum 4 is detected.

Note that the image control device 3 holds the calculated sensitivity correction value in the internal storage device, and outputs the sensitivity correction value held in the storage device to the laser driving device 12 as the current control data (DATA) 25 during its operation in the above-mentioned image light emission mode. The sensitivity correction value input to the laser driving device 12 is input to the sub-current control units 39a and 39b.

Figure 9A:
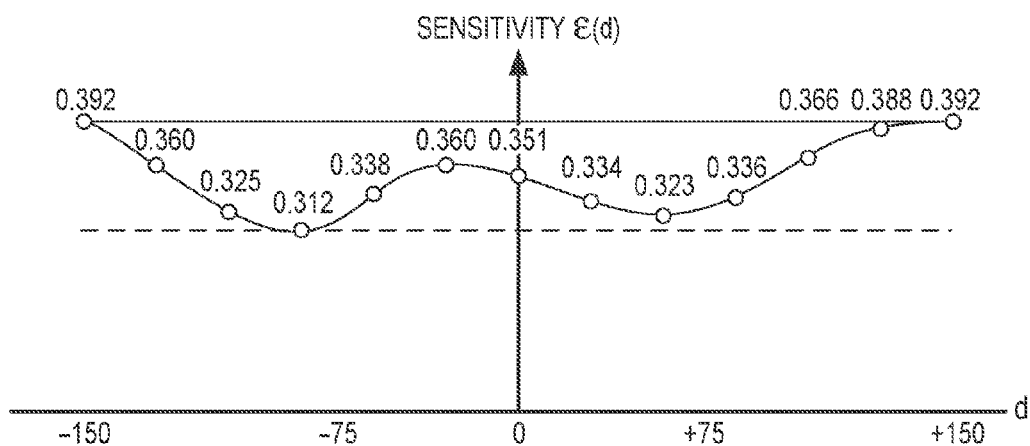
FIGS. 9A and 9B are graphs illustrating an example of the photosensitive characteristics of the photosensitive drum 4 in the main scanning direction.

FIG. 9A is a graph illustrating an example of the sensitivity characteristics of the photosensitive drum 4 in the main scanning direction on the photosensitive drum 4. FIG. 9A shows a main scanning position d on the abscissa, and a sensitivity $\epsilon(d)$ of the photosensitive drum 4 at each of 13 positions in the main scanning direction on the ordinate. More specifically, assuming that the correction range in the main scanning direction (the width in the main scanning direction, across which an electrostatic latent image is formed) on the photosensitive drum 4 is 300 mm (the main scanning position d falls within the range of −150 mm to +150 mm), FIG. 9A shows the sensitivity $\epsilon(d)$ of the photosensitive drum 4 at each of 13 positions in this range.

As can be seen from FIG. 9A, the photosensitive drum 4 has a sensitivity $\epsilon(d)$ which varies in each individual main scanning position d, that is, unevenness of sensitivity (a difference in sensitivity). This unevenness of sensitivity results from unevenness of thickness of a photosensitive layer generated upon the manufacture of the photosensitive drum 4. The sensitivity $\epsilon(d)$ has a value measured using the photosensitive drum 4 upon, for example, the manufacture of the photosensitive drum 4, and is stored in the storage device of the laser driving device 12 or photosensitive drum 4 as sensitivity data, as described above.

Figure 9B:
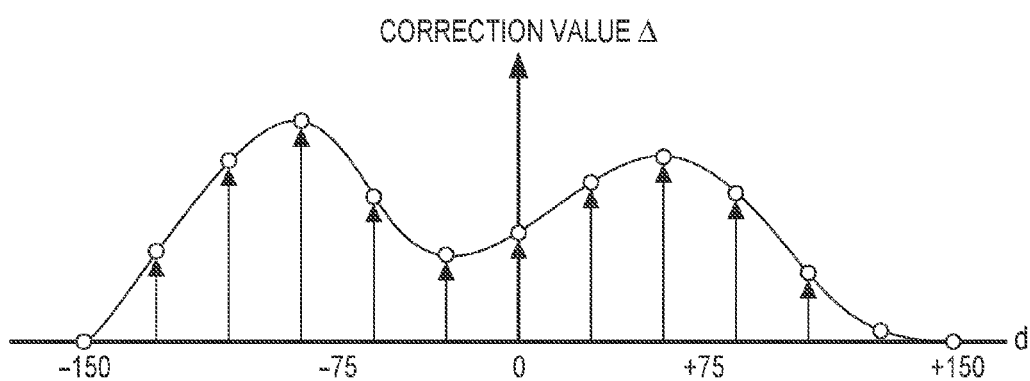

The image control device 3 calculates a sensitivity correction value using sensitivity data as shown in FIG. 9A. The procedure of calculating a sensitivity correction value will be described below with reference to FIGS. 9B and 10 by taking the sensitivity data shown in FIG. 9A as an example. FIG. 9B shows the correction value corresponding to each main scanning position d shown in FIG. 9A in the main scanning direction on the photosensitive drum 4. Note that the following description assumes that the sensitivity correction value has a resolution of 8 bits (256 levels), the semiconductor laser 11 has a maximum power of light $P_{max}=10$ [mW], and the semiconductor laser 11 has a light emission start current (threshold current) $I_{th}=2$ [mA].

The image control device 3 calculates the ratio of the sensitivity $\epsilon(d)$ and calculates a correction value $\Delta$ based on the calculated ratio. A ratio R of the sensitivity $\epsilon(d)$ is obtained by normalization using the maximum value of the sensitivity $\epsilon(d)$ in the main scanning direction. Referring to FIG. 9A, the maximum value of the sensitivity $\epsilon(d)$ is 0.392 at a main scanning position $d=\pm150$ [mm]. Hence, the ratio R at a main scanning position $d=0$ [mm], for example, is calculated as $R=0.351/0.392=0.895$. Using the ratio R, a correction value $\Delta$ is calculated as $\Delta=1-R$. The correction value $\Delta$ at a main scanning position $d=0$ [mm], for example, is calculated as $\Delta=1-0.895=0.105$, as shown in FIG. 9B as well. The image control device 3 similarly calculates a correction value $\Delta$ at each main scanning position d in the main scanning direction.

Figure 10:
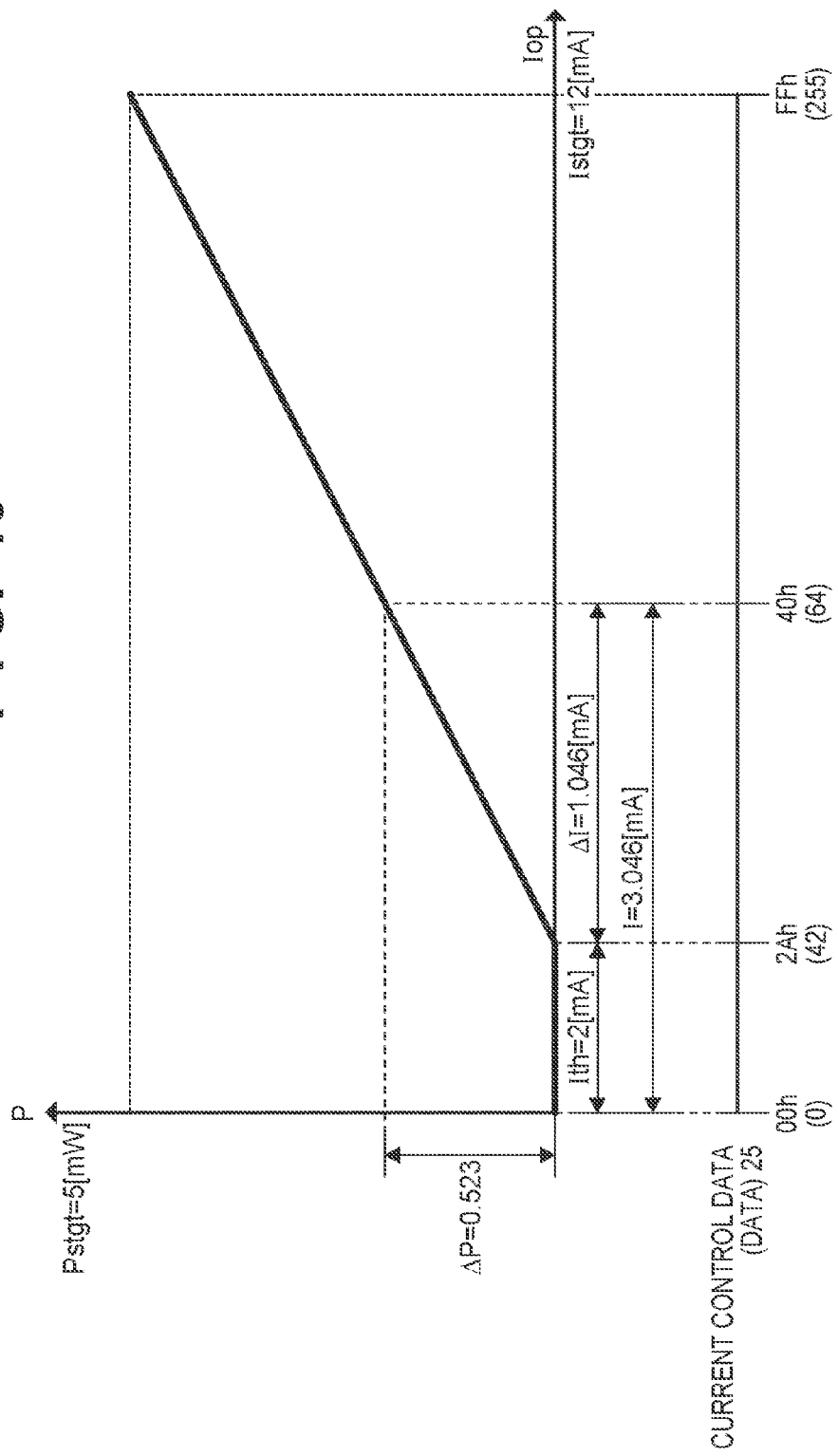
FIG. 10 is a graph illustrating an example of the light emitting characteristics of the semiconductor laser 11 (laser diodes LD1 to LD4)

FIG. 10 is a graph illustrating an example of the light emitting characteristics of the semiconductor laser 11 (laser diodes LD1 to LD4), and shows the drive current I versus light power P characteristics. FIG. 10 assumes that the semiconductor laser 11 has a light emitting efficiency $\eta=0.5$ [mW/mA]. The image control device 3 calculates a sensitivity correction value at, for example, a main scanning position $d=0$ [mm] in the following way. Assuming that the semiconductor laser 11 has set power of light $P_{stgt}=5$ [mW], power of light $\Delta P$ of the semiconductor laser 11 corresponding to a correction value $\Delta=0.105$ for $d=0$ [mm] is calculated as $\Delta P=P_{stgt}\times\Delta=5\times0.105=0.523$ [mW]. From the light emitting characteristics shown in FIG. 10, a current $\Delta I$ corresponding to $\Delta P$ is calculated as $\Delta I=1.046$ [mW]. Further, taking into consideration a threshold current $I_{th}=2$ [mA], a current I corresponding to $\Delta P$ is calculated as $I=3.046$ [mA], as shown in FIG. 10. Lastly, this data is normalized using a current $I_{stgt}=12$ [mA] corresponding to the set power of light $P_{stgt}$, and quantized using 8 bits, thereby calculating a sensitivity correction value of 64.

The above-mentioned arithmetic operation is done for all main scanning positions d determined in advance to calculate sensitivity correction values at all these main scanning positions d. The image control device 3 holds the calculated sensitivity correction values in the storage device, and outputs them to the laser driving device 12 as the current control data (DATA) 25 in the image light emission mode.

As described above, the optical scanning apparatus (exposure apparatus) 2 according to this embodiment employs both a first laser light source (first light source) which outputs a laser beam (light beam) corresponding to a drive current corresponding to image information, and a second laser light source (second light source), in order to irradiate the surface of the photosensitive drum (photosensitive member) 4 with a plurality of laser beams. The second laser light source irradiates the photosensitive drum 4 with a laser beam in accordance with a drive current corresponding to a correction value according to which unevenness of potential characteristics of the surface of the photosensitive drum 4 due to its unevenness of sensitivity is reduced. The same main scanning line (the same region) on the surface of the photosensitive drum 4 is irradiated with laser beams which are output from the first and second laser light sources onto the photosensitive drum 4. That is, on the surface of the photosensitive drum 4, a main scanning line (region) irradiated with a laser beam from one of the first and second laser light sources is irradiated with a laser beam from the other in superposition. It can be determined whether the first or second laser light source irradiates each main scanning line with a laser beam first, in accordance with the exposure scheme of the image forming apparatus 1 equipped with the optical scanning apparatus 2.

As a result, a drive current corresponding to image information can be supplied to the first laser light source at a constant magnitude without changing it in accordance with a sensitivity correction value. On the other hand, the second laser light source can irradiate the photosensitive drum 4 with a laser beam for reducing a charged potential error (unevenness of potential characteristics) of the photosensitive drum 4 due to its unevenness of sensitivity. This makes it possible to avoid an insufficient reduction in charged potential error using a laser beam corresponding to a sensitivity correction value due to a change in light emitting response of the laser light source corresponding to a change in drive current, and to reduce this potential error.

Although a plurality of groups of laser light sources simultaneously scan different main scanning lines to improve the exposure rate in this embodiment, the present invention is also applicable to the use of only one group of laser light sources. In the latter case as well, the same advantage as in this embodiment can be obtained. In this case, none of the laser diodes LD2 and LD4 and the main current control unit 38b and sub-current control unit 39b corresponding to them are necessary.

Moreover, the present invention is applicable not only to the above-mentioned embodiment in which the first and second exposure operations are executed in each region on the surface of the photosensitive drum 4 by a plurality of laser light sources, but also to an embodiment in which the first and second exposure operations are executed in each region on the surface of the photosensitive drum 4 by a single laser light source. In the latter case, for example, the first and second exposure operations executed by the first and second laser light sources, respectively, as described above can be executed on each main scanning line (each region) by one laser light source in time series, that is, twice. The first and second exposure operations can be executed for each main scanning line using light beams in superposition, as in the above-mentioned embodiment. In this case as well, it is possible to reduce an error of the surface potential of the photosensitive drum 4, which remains due to the factors associated with the light emitting response of the laser light source, as in the above-mentioned embodiment. Again, the first and second exposure operations may be executed by each of a plurality of laser light sources which scan different main scanning lines in the sub-scanning direction. In this case, it is possible to reduce an error of the surface potential of the photosensitive drum 4 while improving the exposure rate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-095275, filed Apr. 21, 2011, which is hereby incorporated by reference herein in its entirety.

What is claimed is:

1. An exposure apparatus comprising:
a photosensitive member configured to be driven so as to rotate;
a charging unit configured to charge the photosensitive member;
a light source configured to emit a light beam exposing the photosensitive member;
a deflection unit configured to deflect the light beam such that the light beam scans the photosensitive member;
a developing unit configured to develop an electrostatic latent image which is formed on the photosensitive member by exposure with the light beam, wherein the light beam emitted from the light source and deflected by the deflection unit exposes the photosensitive member at an exposure position between the charging unit and the developing unit in a rotation direction of the photosensitive member; and
a control unit configured to execute a first exposure operation which causes the light source to emit the light beam for exposing the photosensitive member by supplying the light source with a current based on image information, and to execute a second exposure operation which causes the light source to emit the light beam for exposing the photosensitive member by supplying the light source with a current whose value is based on correction data in accordance with a scanning position of the light beam on a surface of the photosensitive member.

2. The apparatus according to claim 1, wherein
the light source comprises a first light source and a second light source, and
the control unit executes the first exposure operation using the first light source, and executes the second exposure operation using the second light source.

3. The apparatus according to claim 2, wherein when an image is formed on the photosensitive member by allowing a developing material to adhere to a portion on the surface of the photosensitive member, which is not exposed with a light beam emitted by the first light source, the control unit controls the light source so that a region exposed with the light beam emitted by the first light source is exposed with a light beam emitted by the second light source.

4. The apparatus according to claim 2, wherein when an image is formed on the photosensitive member by allowing a developing material to adhere to a portion on the surface of the photosensitive member, which is exposed with a light beam emitted by the first light source, the control unit controls the light source so that a region exposed with a light beam emitted by the second light source is exposed with the light beam emitted by the first light source.

5. The apparatus according to claim 2, wherein the light source comprises a plurality of groups of light sources, each of which includes the first light source and the second light source, and light sources included in different groups of light sources expose regions that are different between the different groups of light sources on the surface of the photosensitive member.

6. The apparatus according to claim 2, further comprising:
a light power detection unit which detects light power of a light beam emitted by the first light source,
wherein the control unit sets a drive current, at which the light power detected by the light power detection unit reaches light power determined in advance, as a drive current to be supplied to the first light source in the first exposure operation.

7. The apparatus according to claim 6, wherein the control unit comprises:
a first current supply unit which, in the first exposure operation, modulates a pulse width of the set drive current in accordance with the image information and supplies the drive current to the first light source, and
a second current supply unit which, in the second exposure operation, supplies a current obtained from a measured value of sensitivity of the photosensitive member to the second light source so as to reduce unevenness of charged potential on the surface of the photosensitive member.

8. The apparatus according to claim 1, wherein the control unit continuously supplies the current whose value is based on the correction data to the light source in the second exposure operation.

9. An image forming apparatus comprising:
a photosensitive member configured to be driven so as to rotate;
a charging unit configured to charge the photosensitive member;
an exposure apparatus configured to expose the photosensitive member with a light beam to form an electrostatic latent image on the photosensitive member; and
a developing unit configured to develop the electrostatic latent image formed on the photosensitive member using a developing material to form, on the photosensitive member, an image to be transferred onto a printing material,
wherein the exposure apparatus comprises:
a light source configured to emit a light beam exposing the photosensitive member,
a deflection unit configured to deflect the light beam such that the light beam scans the photosensitive member, wherein the light beam emitted from the light source and deflected by the deflection unit exposes the photosensitive member at an exposure position between the charging unit and the developing unit in a rotation direction of the photosensitive member; and
a control unit configured to execute a first exposure operation which causes the light source to emit the light beam for exposing the photosensitive member by supplying the light source with a current based on image information, and to execute a second exposure operation which causes the light source to emit the light beam for exposing the photosensitive member by supplying the light source with a current whose value is based on correction data in accordance with a scanning position of the light beam on a surface of the photosensitive member.

10. The apparatus according to claim 9, wherein
the light source comprises a first light source and a second light source, and
the control unit executes the first exposure operation using the first light source, and executes the second exposure operation using the second light source.

11. The apparatus according to claim 10, wherein when an image is formed on the photosensitive member by allowing a developing material to adhere to a portion on the surface of the photosensitive member, which is not exposed with a light beam emitted by the first light source, the control unit controls the light source so that a region exposed with the light beam emitted by the first light source is exposed with a light beam emitted by the second light source.

12. The apparatus according to claim 10, wherein when an image is formed on the photosensitive member by allowing a developing material to adhere to a portion on the surface of the photosensitive member, which is exposed with a light beam emitted by the first light source, the control unit controls the light source so that a region exposed with a light beam emitted by the second light source is exposed with the light beam emitted by the first light source.

13. The apparatus according to claim 10, wherein the light source comprises a plurality of groups of light sources, each of which includes the first light source and the second light source, and light sources included in different groups of light sources expose regions that are different between the different groups of light sources on the surface of the photosensitive member.

14. The apparatus according to claim 10, further comprising:
a light power detection unit which detects light power of a light beam emitted by the first light source,
wherein the control unit sets a drive current, at which the light power detected by the light power detection unit reaches light power determined in advance, as a drive current to be supplied to the first light source in the first exposure operation.

15. The apparatus according to claim 14, wherein the control unit comprises
a first current supply unit which, in the first exposure operation, modulates a pulse width of the set drive current in accordance with the image information and supplies the drive current to the first light source, and
a second current supply unit which, in the second exposure operation, supplies a current obtained from a measured value of sensitivity of the photosensitive member to the second light source so as to reduce unevenness of charged potential on the surface of the photosensitive member.

16. The apparatus according to claim 9, wherein the control unit continuously supplies the current whose value is based on the correction data to the light source in the second exposure operation.

* * * * *